US012591485B2

(12) United States Patent
Nakamura

(10) Patent No.: US 12,591,485 B2
(45) Date of Patent: Mar. 31, 2026

(54) STORAGE SYSTEM AND MANAGEMENT METHOD FOR STORAGE SYSTEM

(71) Applicant: Hitachi, Ltd., Tokyo (JP)

(72) Inventor: Tetsuya Nakamura, Tokyo (JP)

(73) Assignee: HITACHI VANTARA, LTD., Kanagawa-ken (JP)

( * ) Notice: Subject to any disclaimer, the term of this patent is extended or adjusted under 35 U.S.C. 154(b) by 0 days.

(21) Appl. No.: 18/601,239

(22) Filed: Mar. 11, 2024

(65) Prior Publication Data

US 2024/0427666 A1 Dec. 26, 2024

(30) Foreign Application Priority Data

Jun. 21, 2023 (JP) ................................. 2023-101999

(51) Int. Cl.
*G06F 11/00* (2006.01)
*G06F 11/10* (2006.01)
(52) U.S. Cl.
CPC ...... *G06F 11/1092* (2013.01); *G06F 11/1096* (2013.01)
(58) Field of Classification Search
CPC ......................... G06F 11/1092; G06F 11/1096
See application file for complete search history.

(56) References Cited

U.S. PATENT DOCUMENTS

| | | | | |
|---|---|---|---|---|
| 6,557,123 B1* | 4/2003 | Wiencko, Jr. | ......... | H03M 13/47 714/701 |
| 7,093,182 B2* | 8/2006 | Dickson | ................ | H03M 13/47 719/325 |
| 7,975,168 B2* | 7/2011 | Morita | ................ | G06F 11/1662 714/6.22 |
| 8,032,781 B1* | 10/2011 | Coatney | .............. | G06F 11/2092 714/4.11 |
| 8,386,834 B1* | 2/2013 | Goel | ..................... | G06F 11/108 714/6.22 |
| 11,132,256 B2* | 9/2021 | Roberts | ............... | G06F 11/2094 |
| 11,797,387 B2* | 10/2023 | Sharma | ............... | G06F 11/1096 |
| 12,399,782 B2* | 8/2025 | Ki | ......................... | G06F 3/0679 |
| 2021/0117123 A1* | 4/2021 | Jakowski | ............. | G06F 3/0689 |
| 2021/0373796 A1* | 12/2021 | Matosevich | ......... | G06F 3/0689 |
| 2023/0273753 A1* | 8/2023 | Pawar | ................... | G06F 3/0647 |
| 2025/0181463 A1* | 6/2025 | Kangarlou | ........... | G06F 9/5077 |

FOREIGN PATENT DOCUMENTS

WO 2017/158824 A1 9/2017

* cited by examiner

*Primary Examiner* — Loan L.T. Truong
(74) *Attorney, Agent, or Firm* — Volpe Koenig

(57) ABSTRACT

A storage system includes a storage apparatus having a plurality of physical drives and a controller. In a case where a physical failure occurs in a physical drive, the controller additionally installs a drive provided from a cloud, and maintains a redundant array of inexpensive disks (RAID) configuration before the occurrence of the physical failure in the physical drive using the physical drives excluding the physical drive where the physical failure has occurred and the additionally installed drive provided from the cloud.

9 Claims, 20 Drawing Sheets

*FIG. 3*

| DEVICE NAME | VOLUME ID |
|---|---|
| /dev/sdb | vol-082b07051043174b9 |
| xvdb | vol-0a4064b39e5f534a2 |

*FIG. 4*

| IQN | LUN | NAME OF DEVICES CONFIGURING LUN |
|---|---|---|
| iqn.1994-04.jp.co.hitachi:example.cloud.0001 | 0 | /dev/sdb |
| iqn.1994-04.jp.co.hitachi:example.cloud.0001 | 1 | xvdb |

| DEVICE NAME $\overset{501}{}$ | iSCSI DEVICE FLAG $\overset{502}{}$ | IQN OF iSCSI DEVICE $\overset{503}{}$ | LUN OF iSCSI DEVICE $\overset{504}{}$ |
|---|---|---|---|
| /dev/sdb | 0 (SSD IS CONNECTED AS PHYSICAL DEVICE) | - | - |
| /dev/sdc | 0 | - | - |
| /dev/sdd | 1 | iqn.1994-04.jp.co.hitachi:example.cloud.0001 | 0 |
| /dev/sde | 1 | iqn.1994-04.jp.co.hitachi:example.cloud.0001 | 1 |

| NAME OF VIRTUAL DEVICE AFTER RAID IS CONFIGURED $\overset{601}{}$ | TYPE OF RAID $\overset{602}{}$ | NAME OF DEVICES CONFIGURING RAID $\overset{603}{}$ | ROLE FOR CONFIGURING RAID $\overset{604}{}$ |
|---|---|---|---|
| /dev/vsdb | RAID3 | /dev/sdb | MAIN |
| /dev/vsdb | RAID3 | /dev/sdc | MAIN |
| /dev/vsdb | RAID3 | /dev/sdd | PARITY CODE |

| IQN | LUN | DEVICE NAME |
|-----|-----|-------------|
| | 701 | 702 | 703 |
| iqn.1994-04.jp.co.hitachi:example.storage.0001 | 0 | /dev/vsdb |

Figure 21:
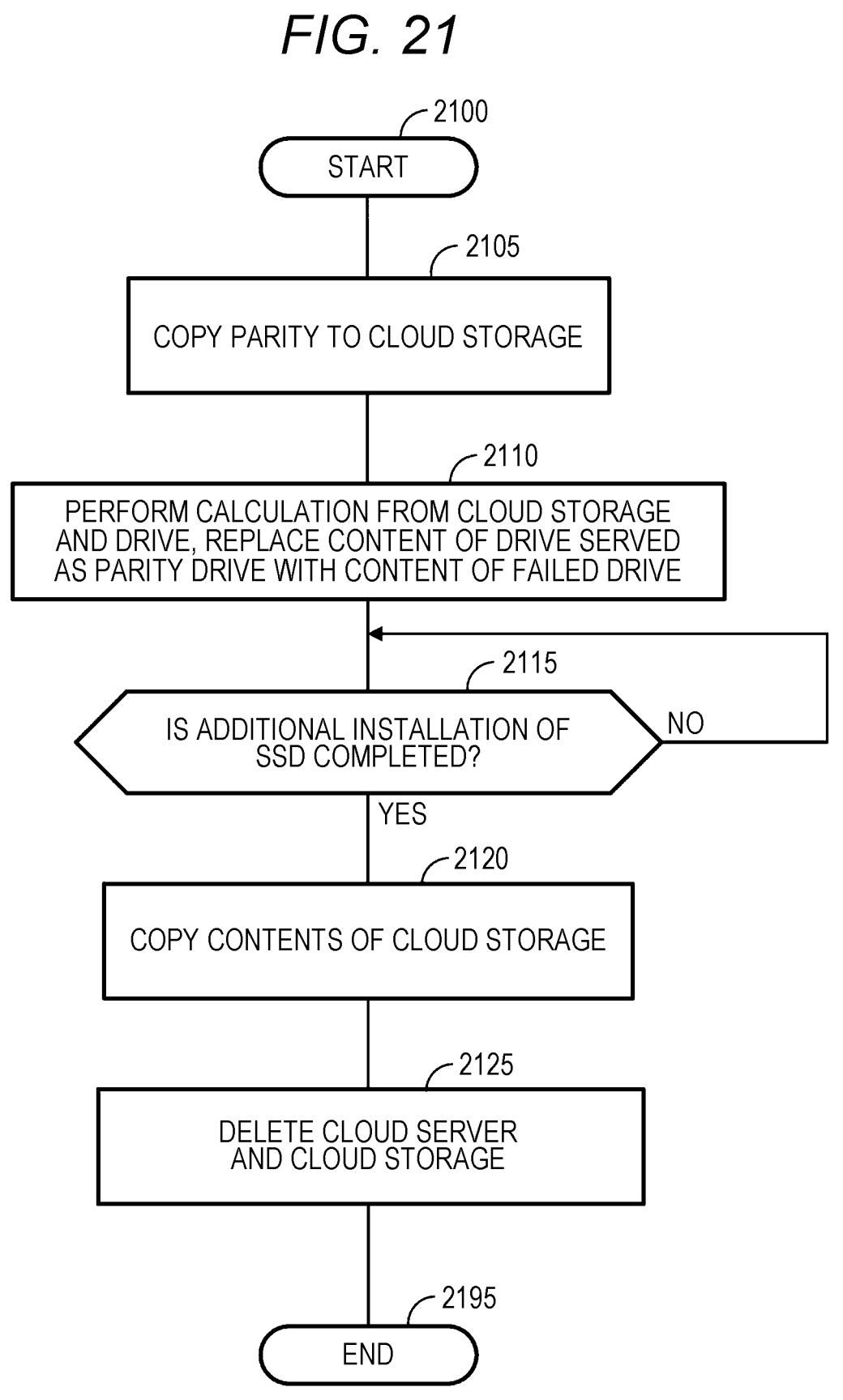

START

2105

COPY PARITY TO CLOUD STORAGE

2110

PERFORM CALCULATION FROM CLOUD STORAGE
AND DRIVE, REPLACE CONTENT OF DRIVE SERVED
AS PARITY DRIVE WITH CONTENT OF FAILED DRIVE

2115

IS ADDITIONAL INSTALLATION OF
SSD COMPLETED?　　　NO

YES

2120

COPY CONTENTS OF CLOUD STORAGE

2125

DELETE CLOUD SERVER
AND CLOUD STORAGE

2195

END

STORAGE SYSTEM AND MANAGEMENT METHOD FOR STORAGE SYSTEM

BACKGROUND OF THE INVENTION

1. Field of the Invention

The present invention relates to a storage system and a management method for the storage system.

2. Description of the Related Art

A typical storage system operating in an on-premises environment provides a logical storage area from a parity group that is a group of a plurality of physical drives converted into a redundant array of inexpensive disks (RAID) to a service server.

As a technique related to the present invention, a resource lending system described in WO 2017/158824 A is present. A management system of the resource lending system selects an unused list in a client system, and instructs a storage controller to construct a RAID using a predetermined number of selected unused resources. The management system provides a resource where the RAID is configured as a lending resource to a customer via a network, and manages the operation of the lending resource until a use period of the customer ends.

SUMMARY OF THE INVENTION

In a physical drive (memory apparatus) used in the storage system in the on-premises environment, a failure (physical failure) may occur at a certain frequency. Even in a case where a failure occurs, redundancy is maintained in the storage system by forming a RAID configuration. On the other hand, in the storage system, due to the presence of a drive that cannot be used due to a failure, the redundancy is decreased by the number of drives that cannot be used for a long period until a failed drive is replaced (for example, several hours to several days). The storage system has a risk of loss of data in a case where an additional physical failure occurs during the period.

WO 2017/158824 A does not describe that a RAID is constructed using a resource provided by a cloud when a physical failure occurs in a physical drive.

The present invention has been made to solve the above problems. That is, an object of the present invention is to provide a storage system capable of reducing a possibility that a period during which the redundancy decreases become long in a case where a physical failure occurs in a memory apparatus configuring the RAID, and a management method for the storage system.

In order to solve the above problem, an aspect of the present invention provides a storage system including a storage apparatus having a plurality of memory apparatuses and a controller, the plurality of memory apparatuses or the plurality of memory apparatuses and a memory area provided by a cloud configuring redundant array of inexpensive disks (RAID), the plurality of RAIDed memory apparatuses or the plurality of memory apparatuses and the memory area providing a volume to a computer, wherein the controller additionally installs the memory area in a case where a physical failure occurs in the memory apparatus among the plurality of memory apparatuses, and maintains a RAID configuration before occurrence of the physical failure in the memory apparatus using the plurality of memory apparatuses excluding the memory apparatus where the physical failure has occurred and the memory area additionally installed.

An aspect of the present invention provides a management method for a storage system including a storage apparatus having a plurality of memory apparatuses and a controller, the plurality of memory apparatuses or the plurality of memory apparatuses and a memory area provided by a cloud configuring a redundant array of inexpensive disks (RAID), the plurality of RAIDed memory apparatuses or the plurality of memory apparatuses and the memory area providing a volume to a computer, the method including causing the controller to additionally install the memory area in a case where a physical failure occurs in the memory apparatus among the plurality of memory apparatuses, and to maintain a RAID configuration before occurrence of the physical failure in the memory apparatus using the plurality of memory apparatuses excluding the memory apparatus where the physical failure has occurred and the memory area additionally installed.

According to the present invention, in a case where a physical failure occurs in a memory apparatus configuring a RAID, it is possible to reduce a possibility that a period during which redundancy decreases becomes long. Note that the effects described herein are not necessarily limited, and may be any of the effects described in the present disclosure.

BRIEF DESCRIPTION OF THE DRAWINGS

FIG. 3 explains device management information;

FIG. 4 explains correspondence information between a logical unit number (LUN) of a logical unit (LU) and a device provided as an Internet Small Computer System Interface (iSCSI) target by a cloud server;

FIG. 5 explains device management information;

FIG. 6 explains configuration information about software redundant array of inexpensive disks (RAID);

FIG. 7 explains information about an LU provided by the storage apparatus;

FIG. 16 illustrates a configuration example of a system including a storage system according to a second embodiment of the present invention;

FIG. 21 is a flowchart illustrating a process executed by the controller of the storage system.

DESCRIPTION OF THE PREFERRED EMBODIMENTS

Figure 1:
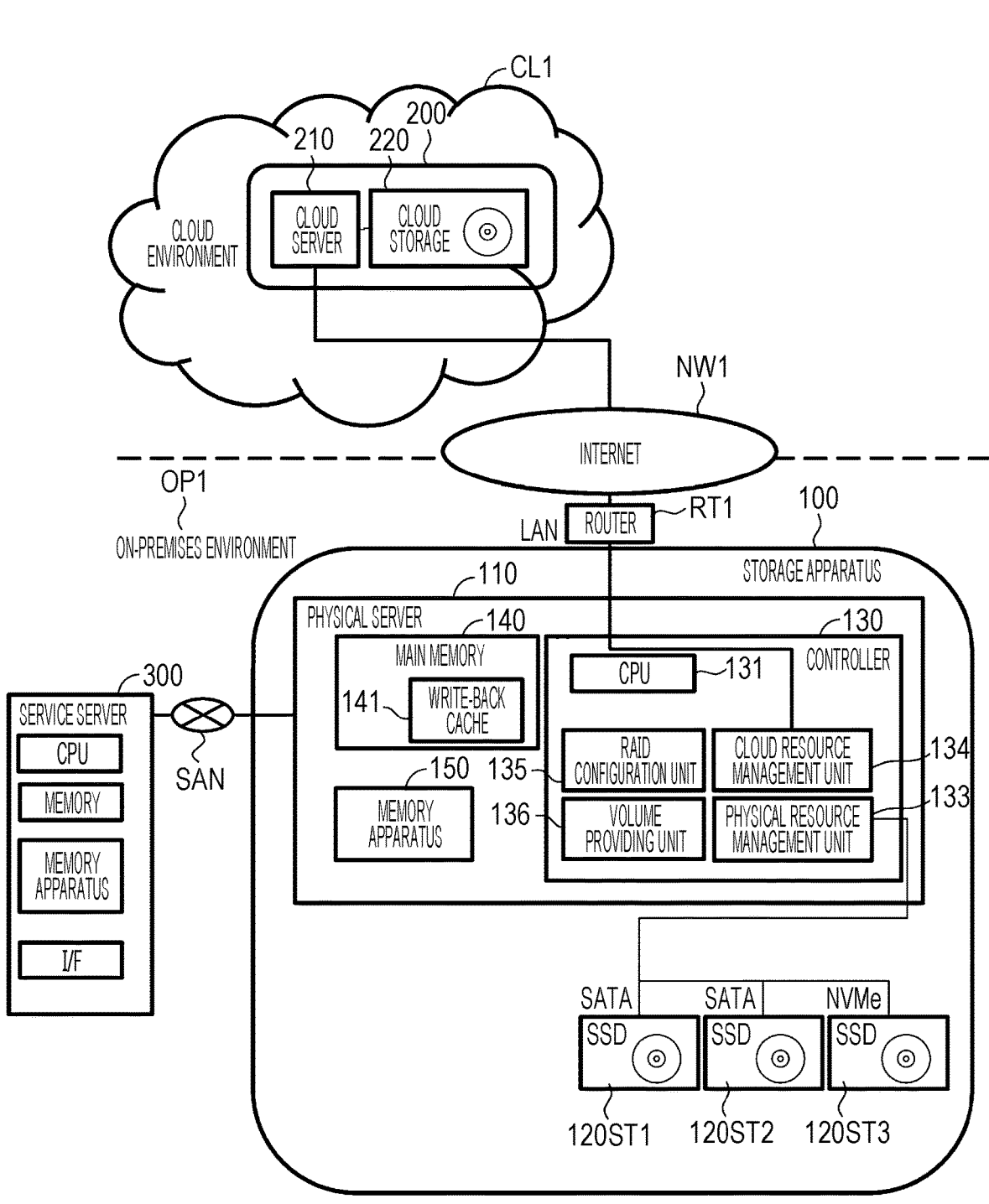
FIG. 1 illustrates a configuration example of a system including a storage system according to a first embodiment of the present invention.

Hereinafter, embodiments of the present invention will be described with reference to the drawings. In all the drawings of the embodiments, the identical or corresponding parts may be denoted by identical reference numerals.

Various types of information may be described below in terms of expressions such as a "record", but various types of information may be expressed in a data structure other than this. In the description about identification information, expressions such as, "ID" and "name", are used, but they can be replaced with each other. In the following description, a process may be described with a program or a functional block as a subject, but the subject of the process may be a central processing unit (CPU), a controller, or a device instead of the program or the functional block.

First Embodiment

A storage system according to a first embodiment of the present invention will be described. FIG. 1 illustrates a configuration example of a system including the storage system according to the first embodiment of the present invention.

The system is a computer system constructed in a hybrid cloud including a cloud environment CL1 and an on-premises environment OP1. The system includes a storage apparatus 100, a cloud 200 constructed in the cloud environment CL1, and a service server 300 constructed in the on-premises environment OP1. The storage system includes a storage apparatus 100 to which a resource is provided from the cloud 200 of the cloud environment CL1 as necessary. The storage apparatus 100 and the cloud 200 are connected via a network NW1 (the Internet) and a router RT1 so as to be able to transmit and receive information to and from each other. The router RT1 is a local area network (LAN) router.

The storage apparatus 100 includes a physical server 110 and a plurality of physical drives 120ST1 to 120ST3. In a case where it is not necessary to particularly distinguish the physical drives 120ST1 to 120ST3, they are referred to as "physical drives 120ST".

The physical server 110 includes a controller 130, a main memory 140, and a memory apparatus 150. The controller 130 provides the service server 300 with a function as a storage. The controller 130 includes a CPU 131. The CPU 131 is hardware that controls the operation of the controller 130.

The CPU 131 performs a data reading operation and a data writing operation in response to a reading command and a writing command that are input-output (I/O) requests given from the service server 300 via a storage area network (SAN). Note that the controller 130 may be configured by a program. That is, the function of the controller 130 may be achieved by the CPU 131 executing the program.

The main memory 140 is a main memory apparatus of the CPU 131 and includes a write-back cache area 141. The write-back cache area 141 temporarily stores data to be written from the service server 300 to a cloud storage 220. In a case where writing data to the cloud storage 220, the CPU 131 performs write-back cache for temporarily writing the data to the write-back cache area 141 and later writing the data to the cloud storage 220 in a free time or the like. That is, the CPU writes the data to the cloud storage 220 asynchronously with a response to the completion of the writing to the service server 300.

The main memory 140 includes, for example, a semiconductor memory such as a synchronous dynamic random access memory (SDRAM), and is used to store (retain) various programs and data.

The memory apparatus 150 is, for example, a non-volatile memory apparatus (storage medium) capable of reading (reading) and writing data, and stores programs executed by the CPU 131, various tables referred to by the CPU 131, and the like. The memory apparatus 150 stores programs for implementing the functions of a physical resource management unit 133, a cloud resource management unit 134, a RAID configuration unit 135, and a volume providing unit 136 of the controller 130. The CPU 131 implements these various functions by executing the programs for implementing these functions.

The plurality of physical drives 120ST includes a non-volatile memory apparatus (for example, an SSD, an FC drive, an NVMe storage, an SAS drive, an SATA drive, a flash module drive (FMD)) or the like capable of reading and writing data.

The cloud 200 included in the cloud environment CL1 includes a cloud server 210 and the cloud storage 220. The cloud 200 is a cloud service that provides resources such as the cloud server 210 and the cloud storage 220 via the network NW1. The cloud server 210 is, for example, a virtual computer (virtual server) provided by the cloud 200. The cloud storage 220 is a storage provided by the cloud 200. The storage provided by the cloud 200 can function as a drive where a parity group that is a group of the physical drives 120ST of the storage apparatus 100 and RAIDed drives can be made up.

More specifically, the cloud server 210 is, for example, a virtual machine provided by a virtual server service of the cloud 200. More specifically, the cloud storage 220 is, for example, a storage volume provided by a block storage service of the cloud 200. The cloud server 210 and the cloud storage 220 are, for example, virtual machines to which storage volumes are attached.

The service server 300 is connected to the storage apparatus 100 via the SAN so as to be able to transmit and receive information to and from each other. A volume is provided from the storage apparatus 100 to the service server 300. A volume is mounted in the service server 300. The service server 300 is a computer (a server apparatus) that issues the I/O request.

The service server 300 may be a physical computer or a virtual computer. The service server 300 is connected to the physical server 110 via an interface I/F and the SAN included in the service server 300. The service server 300 includes a computer including a CPU, a memory, a non-volatile memory apparatus (storage medium) capable of reading and writing data, an interface I/F, and the like.

Figure 2:
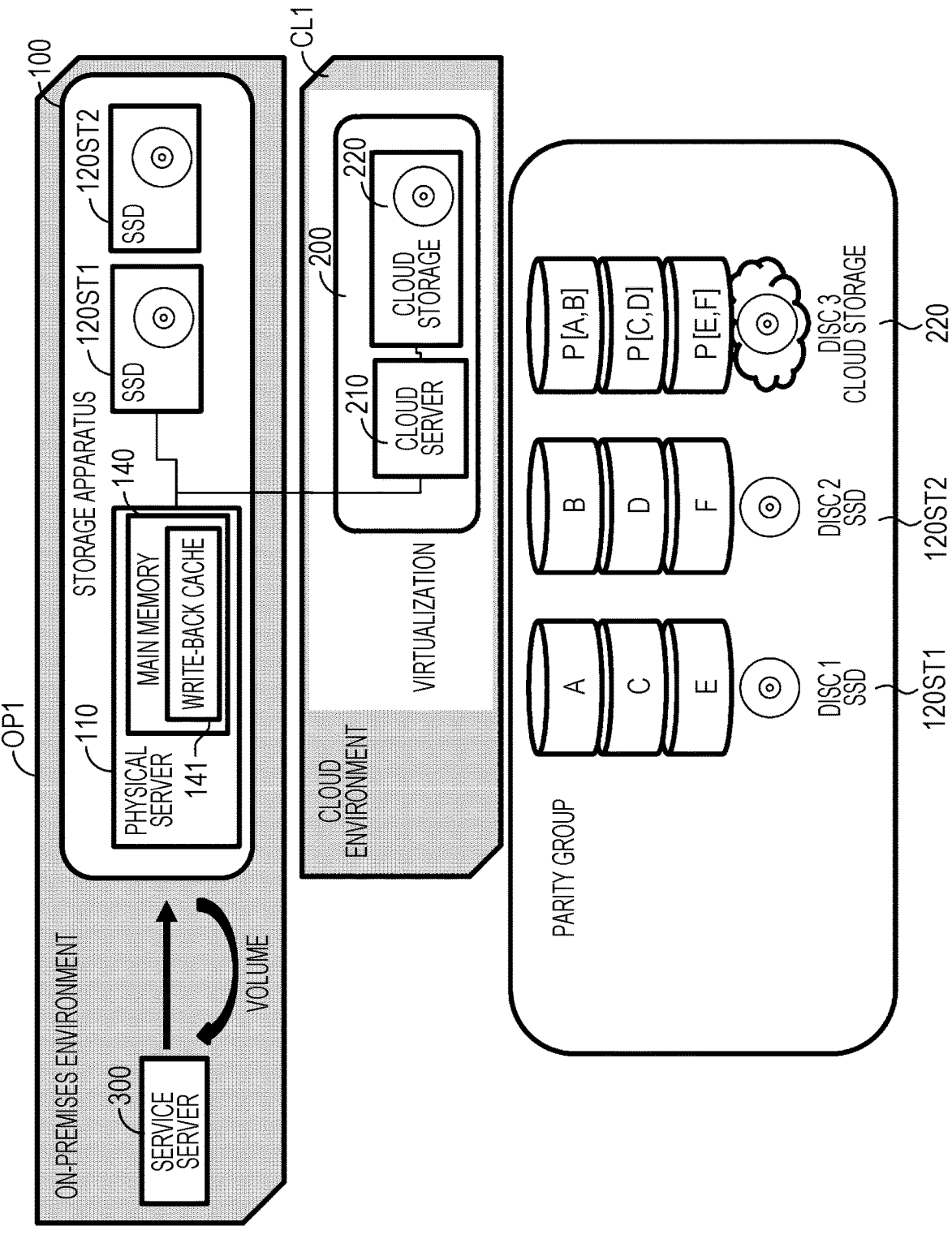
FIG. 2 explains an outline of the storage system according to the first embodiment of the present invention.

FIG. 2 explains an outline of the storage system according to the first embodiment of the present invention. As illustrated in FIG. 2, in the storage system according to the first embodiment of the present invention, in the storage apparatus 100, a RAID is configured by, for example, a disc 1 (the physical drive 120ST1 (SSD 1)), for example, a disc 2

(the physical drive 120ST2 (SSD 2)), and, for example, a disc 3 (the cloud storage 220). Note that the disc 3 (the cloud storage 220) is a memory area provided from the cloud 200, and may also be referred to as a "memory area" for convenience.

This group of the RAIDed drives is called a parity group. The RAID is configured by software RAID that implements the RAID using software.

The parity group is configured by, for example, a RAID 3. In the RAID 3, the controller 130 of the physical server 110 divides data on a byte-by-byte basis and writes the divided data to a disc (drive) in parallel. The controller 130 adds an error correction code (parity code or redundancy code) to the divided data and stores the data in the parity disk (the disc 3) for parity. In the first embodiment, the parity disc (also referred to as a "parity drive") is the disc 3 (the cloud storage 220).

The parity group may be configured by, for example, a RAID 4. In this case, the RAID 4 is obtained by setting a data processing unit of the RAID 3 to a block unit. Data is divided in a block unit and written in parallel to a disc (drive), and a parity code is written to a dedicated parity disc (parity drive) for parity.

Note that the parity group may be configured with another RAID level.

In the storage system according to the first embodiment, the disc 3 (the cloud storage 220) is used as the parity disk (parity drive). Therefore, in the storage system according to the first embodiment, the access to the cloud storage 220 via the network NW1 does not have to be made during the reading of data, this reduce the possibility that a response during the reading of data is delayed.

FIG. 3 explains device management information 310 that is information about a device mounted in the cloud server 210. The device management information 310 is stored in the cloud server 210. The device management information 310 stores a device name 311 and a volume ID 312 as columns for storing information (values). The device management information 310 stores information (values) corresponding respectively to the columns regarding devices mounted in the cloud server 210, as information (records) on a line-by-line basis in association with each other. Specifically, the device name 311 stores the names of devices (volumes) mounted (recognized) by the cloud server 210. The volume ID 312 stores IDs of volumes.

FIG. 4 explains correspondence information 400 between a logical unit number (LUN) of a logical unit (LU) and a device provided as an Internet Small Computer System Interface (iSCSI) target by the cloud server 210. The correspondence information 400 is stored in the cloud server 210.

The correspondence information 400 stores an iSCSI qualified name (IQN) 401, a LUN 402, and a device name 403 constituting the LUN as columns where information (values) is stored. The correspondence information 400 stores information (values) corresponding respectively to columns regarding correspondence relationships with the devices configuring a LU provided as an iSCSI target by the cloud server 210, as information (records) on a line-by-line basis in association with each other.

Specifically, the IQN 401 stores identification information about an iSCSI target. The LUN 402 stores a LUN assigned to identify a plurality of logical units (LUs). The device name 403 constituting the LUN stores the names of devices constituting the LUN.

FIG. 5 explains device management information 500 that is information about a device mounted (recognized by) in the physical server 110. The device management information 500 is stored in the memory apparatus 150.

The device management information 500 stores a device name 501, an iSCSI device flag 502, an IQN 503 of the iSCSI device, and a LUN 504 of the iSCSI device as columns for storing information (values). The device management information 500 stores the information (values) corresponding respectively to the columns regarding the devices mounted (recognized by) in the physical server 110 as information (records) on a line-by-line basis in association with each other.

Specifically, the device name 501 includes the names of devices mounted in the physical server 110. The iSCSI device flag 502 stores a flag value "0" or "1" indicating whether a device is connected as a physical device or as a device of the cloud environment CL1. In a vase where the flag value is "0", the value indicates that a physical drive (SSD) is connected as the physical device. In a case where the flag value is "1", the value indicates that the cloud storage 220 provided from the cloud environment CL1 is connected. The IQN 503 of the iSCSI device stores IQNs of an iSCSI target. The LUN 504 stores LUNs assigned to identify the plurality of logical units.

FIG. 6 explains configuration information 600 about software RAID. The configuration information 600 is stored in the memory apparatus 150.

The configuration information 600 includes, as columns in which information (values) is stored, a virtual device name 601 after configuration of RAID, a RAID type 602, a device name 603 configuring the RAID, and a role 604 in configuring the RAID.

The configuration information 600 stores information corresponding respectively to the columns related to the configurations of software RAIDs as information (record) on a line-by-line basis in association with each other. Specifically, the virtual device name 601 after the configuration of the RAID stores the names of virtual devices recognized after the configuration of the RAID. The RAID type 602 stores RAID types. The device name 603 constituting the RAID stores the names of devices constituting the RAID. The role 604 in configuring the RAID stores information indicating roles in configuring the RAID.

FIG. 7 explains information 700 about the LU provided by the storage apparatus 100. The information 700 is stored in the memory apparatus 150.

The information 700 includes an IQN 701, an LUN 702, and a device name 703 as columns where information (values) is stored. The information 700 stores information corresponding respectively to the columns related to the LUNs provided by the storage apparatus 100, as information (records) on a line-by-line basis in association with each other. Specifically, the IQN 701 stores identification information about an iSCSI target. The LUN 702 stores LUNs assigned to identify the plurality of LUs. The device name 703 stores the names of devices provided by the storage apparatus 100 to the service server 300.

<Use Case>

Figure 8:
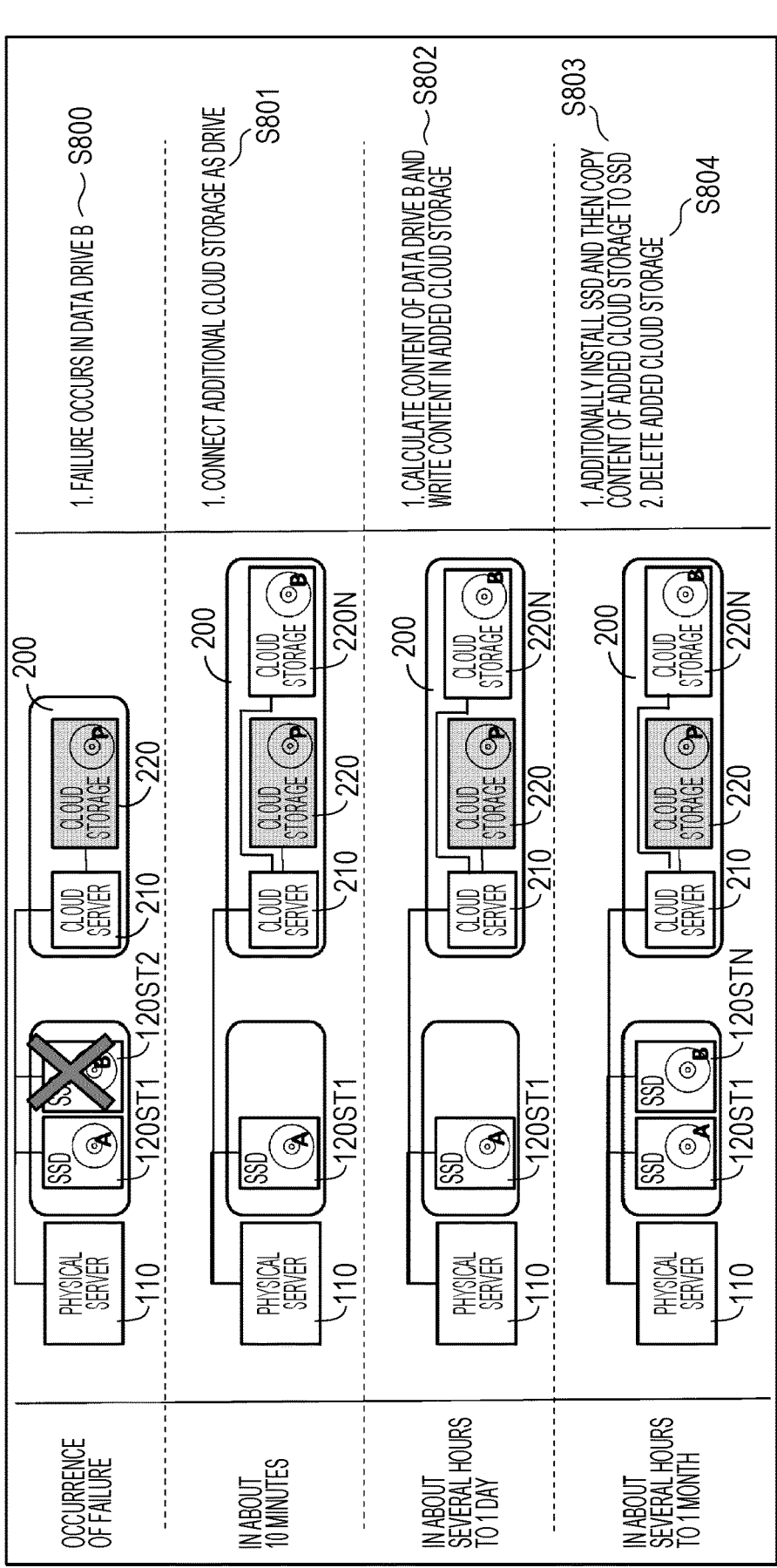
FIG. 8 explains an example of a use case of the storage system according to the first embodiment.

In order to make understanding of the present invention easy, an example of a use case of the storage system according to the first embodiment will be described. FIG. 8 explains an example of the use case of the storage system according to the first embodiment.

A failure (physical failure) occurs in the physical drive 120ST2 (a data drive B) (S800). The storage apparatus 100 connects an additional cloud storage 220N (a cloud storage B) as a drive (S801). The storage apparatus 100 calculates the contents of the physical drive 120ST2 (the data drive B)

by data restoration based on the RAID configuration, and writes the contents in the added cloud storage 220N (the cloud storage B) (S802). After additionally installing the physical drive 120STN (SSD), the storage apparatus 100 copies the contents of the added cloud storage 220N to the added physical drive 120STN (SSD) (S803). The storage apparatus 100 deletes the added cloud storage 220N (S804).

In the storage system according to the first embodiment, in a case where a failure occurs in the physical drive 120ST of the storage apparatus 100 in the on-premises environment OP1, the failed physical drive 120ST2 can be quickly replaced with the cloud storage 220N (the cloud storage B) to maintain the RAID configuration. This can shorten the period during which the redundancy is deteriorated. For example, as described in the use case, the RAID can be configured (reconfigured) in a short time (for example, about 10 minutes) after the failure occurs, thus shortening the period during which the redundancy is deteriorated due to the failure of the physical drive 120ST2.

Further, in the storage system according to the first embodiment, when the additional installation of the physical drive 120STN is completed after the failed physical drive 120ST2 is replaced by the cloud storage 220N, the unnecessary cloud storage 220N is deleted, thus reducing the cost.

<Operation>

Figure 9:
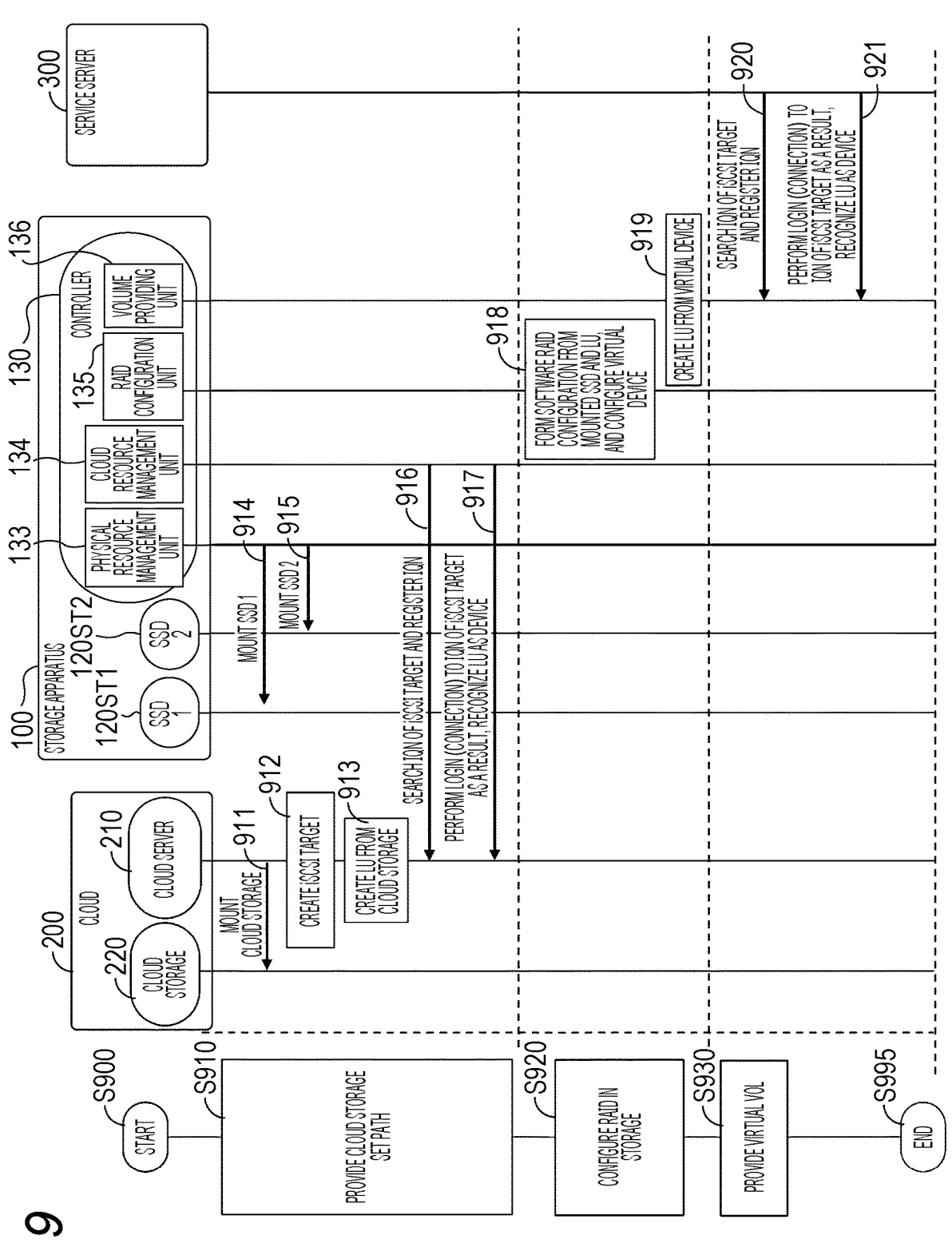
FIG. 9 is a flowchart and a sequence diagram for explaining an operation of the storage system.

The operation of the storage system according to the first embodiment will be described. FIG. 9 is a flowchart and a sequence diagram for explaining the operation of the storage system.

The flowchart of FIG. 9 illustrates an outline of the operation of the storage system for mounting (recognizing) the storage apparatus 100 the cloud storage 220 and configuring the RAID. As illustrated in the flowchart of FIG. 9, the storage system starts the operation in S900, sequentially performs the operations in S910 to S930 described below, then proceeds to S995, and ends the operation flow.

S910: In the storage system, the cloud storage 220 is provided from the cloud 200, a path is set.

S920: In the storage system, a RAID is configured in the storage apparatus 100.

S930: In the storage system, a virtual volume (VOL) is provided from the storage apparatus 100 to the service server 300.

The sequence diagram of FIG. 9 illustrates details of the operation of the storage system for mounting the storage apparatus 100 mounts (recognizing) the cloud storage 220 and configuring the RAID. Steps 911 to 917 correspond to the operation in S910 in the flowchart. Steps 918 and 919 correspond to the operation in S920 in the flowchart. Steps 920 and 921 correspond to the operation in S930 in the flowchart.

Step 911: The cloud server 210 mounts the cloud storage 220. The cloud server 210 updates the device management information 310.

Step 912: The cloud server 210 performs settings to serve as an iSCSI target that provides the LU created in the cloud storage 220 mounted by the cloud server 210 to the iSCSI initiator. As a result, the cloud server 210 is created as an iSCSI target.

Step 913: The cloud server 210 creates the LU from the cloud storage 220. That is, the cloud server 210 creates the LU of the cloud storage 220 recognized by the cloud server 210 from the mounted cloud storage 220. The cloud server 210 updates the correspondence information 400.

Step 914: The physical resource management unit 133 mounts the physical drive 120ST1 (hereinafter, also referred to as "SDD1") in the physical server 110. The physical resource management unit 133 updates the device management information 500.

Step 915: The physical resource management unit 133 mounts the physical drive 120ST2 (hereinafter, also referred to as "SDD2") in the physical server 110. The physical resource management unit 133 updates the device management information 500.

Step 916: The cloud resource management unit 134 searches the cloud server 210 for an IQN of the cloud server 210 (iSCSI target) and registers the IQN (registers in the device management information 500).

Step 917: The cloud resource management unit 134 logs in (connects) to the IQN of the iSCSI target (the cloud server 210). That is, the cloud resource management unit 134 functions as the iSCSI initiator, and logs in (connects) to the IQN of the cloud server 210, which is the iSCSI target, via the network NW1. This enables the cloud resource management unit 134 to access to the cloud server 210 (iSCSI target) via the network. As a result, the cloud resource management unit 134 recognizes the LU of the cloud storage 220 mounted in the cloud server 210 as a device. The cloud resource management unit 134 updates the device management information 500.

Step 918: The RAID configuration unit 135 sets a software RAID configuration from the SSD 1 and the SSD 2 mounted in the storage apparatus 100 and the LU of the cloud storage 220, and configures a virtual device. The RAID configuration unit 135 updates the configuration information 600.

Step 919: The volume providing unit 136 creates an LU that is a logical memory area from the virtual device. The volume providing unit 136 updates the information 700.

Step 920: The service server 300 searches the volume providing unit 136 for the IQN of the physical server 110 (iSCSI target) and registers the IQN.

Step 921: The service server 300 logs in (connects) to the IQN of the iSCSI target (the physical server 110). That is, the service server 300 functions as the iSCSI initiator, and logs in (connects) to the IQN of the physical server 110, which is the iSCSI target, via the SAN. Thus, the service server 300 (ISCSI initiator) can access to the physical server 110 (ISCSI target) via the SAN. As a result, the service server 300 recognizes the LU of the virtual device recognized by the physical server 110 (the storage apparatus 100) as a device (volume).

Figure 10:
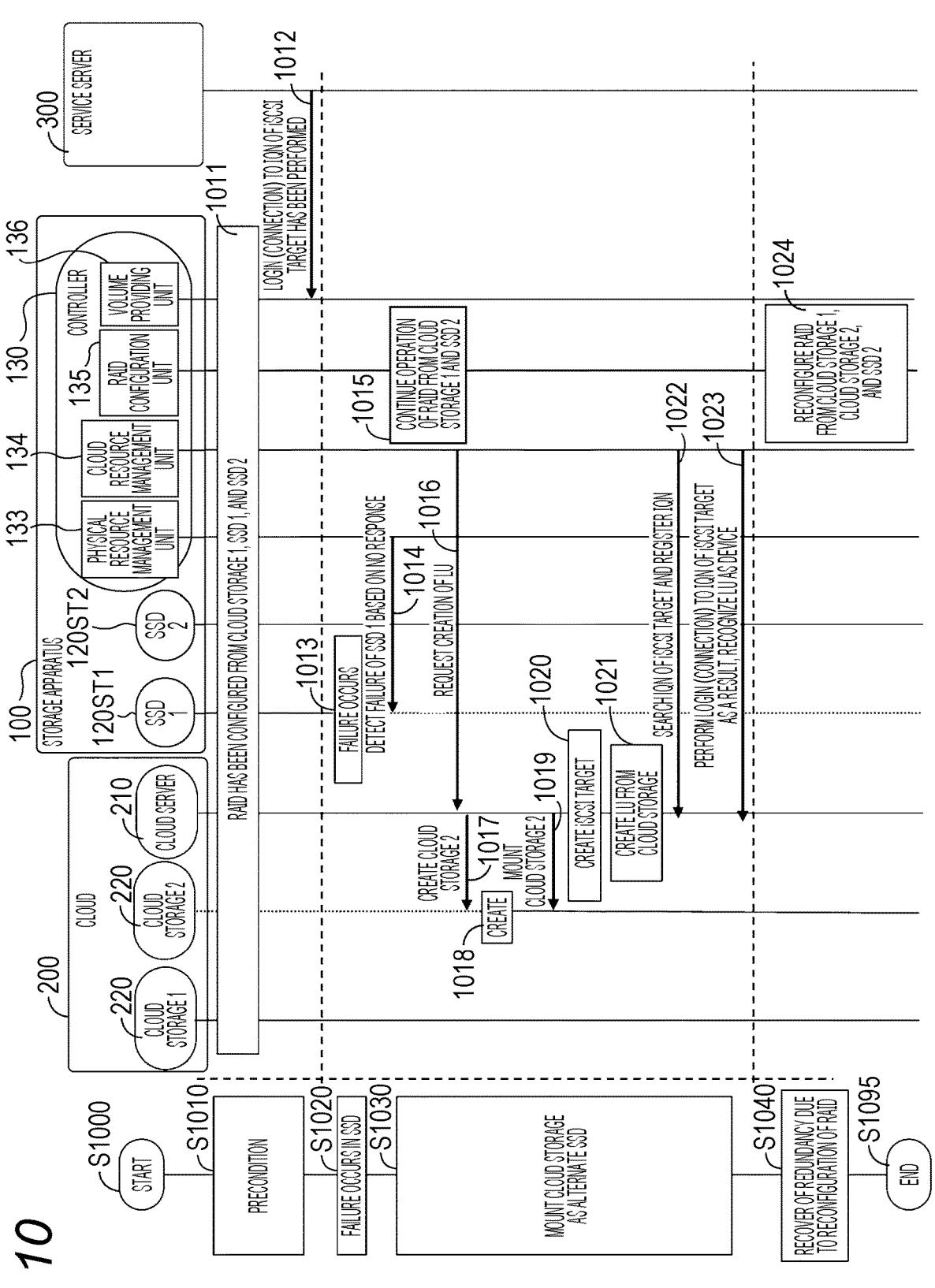
FIG. 10 is a flowchart and a sequence diagram for explaining an operation of the storage system.

FIG. 10 is a flowchart and a sequence diagram for explaining the operation of the storage system. The flowchart of FIG. 10 illustrates an outline of the operation of the storage system for additionally installing the cloud storage 220 as an alternative at a time of a failure of the SSD.

As illustrated in the flowchart of FIG. 10, the storage system starts the operation in S1000, sequentially performs the operations in S1010 to S1040 described below, then proceeds to S1095, and ends the operation flow.

S1010: The storage system is in a state where an operation satisfying a pre-condition has been completed.

S1020: A failure of the SSD 1 occurs in the storage system.

S1030: The storage system mounts the cloud storage 220 as an alternative to the failed SSD 1.

S1040: The storage system recovers the redundancy with the RAID reconfiguration.

The sequence diagram of FIG. 10 illustrates details of the operation of the storage system for additionally installing the cloud storage 220 as an alternative at a time of a failure of the SSD. Steps 1011 and 1012 correspond to the operation in S1010 in the flowchart. Steps 1013 to 1023 correspond to the operations in S1020 and S1030 in the flowchart. Step 1024 corresponds to the operation in S1040 in the flowchart.

Step 1011: The cloud 200 and the storage apparatus 100 are in a state where the RAID has been configured from the cloud storage 1 (the cloud storage 220), the SSD 1, and the SSD 2.

Step 1012: The service server 300 has logged in (connected) to the IQN of the iSCSI target (the physical server 110).

Step 1013: A failure of the SSD 1 occurs.

Step 1014: The physical resource management unit 133 detects the failure of the SSD 1 when the SSD 1 makes no response.

Step 1015: The RAID configuration unit 135 continues the operation in the cloud storage 1 and the SSD 2 other than the SSD 1 having a failed RAID.

Step 1016: The cloud resource management unit 134 requests the cloud server 210 to create an LU.

Step 1017: The cloud server 210 creates a cloud storage 2 (the cloud storage 220).

Step 1018: The cloud storage 2 is created.

Step 1019: The cloud server 210 mounts the cloud storage 2. The cloud server 210 updates the device management information 310.

Step 1020: The cloud server 210 creates an iSCSI target. That is, the cloud server 210 creates the cloud server 210 as the iSCSI target by performing settings for serving the LU as the iSCSI target to be provided to the iSCSI initiator.

Step 1021: The cloud server 210 creates the LU from the cloud storage 2. The cloud server 210 updates the correspondence information 400.

Step 1022: The cloud resource management unit 134 searches for an IQN of the iSCSI target on the network NW1 and registers the IQN (registers in the device management information 500).

Step 1023: The cloud resource management unit 134 logs in (connects) to the IQN of the iSCSI target. As a result, the LU is recognized as a device. The cloud resource management unit 134 updates the device management information 500.

Step 1024: The RAID configuration unit 135 reconfigures the RAID from the cloud storage 1, the cloud storage 2, and the SSD 2. The RAID configuration unit 135 updates the configuration information 600.

Figure 11:
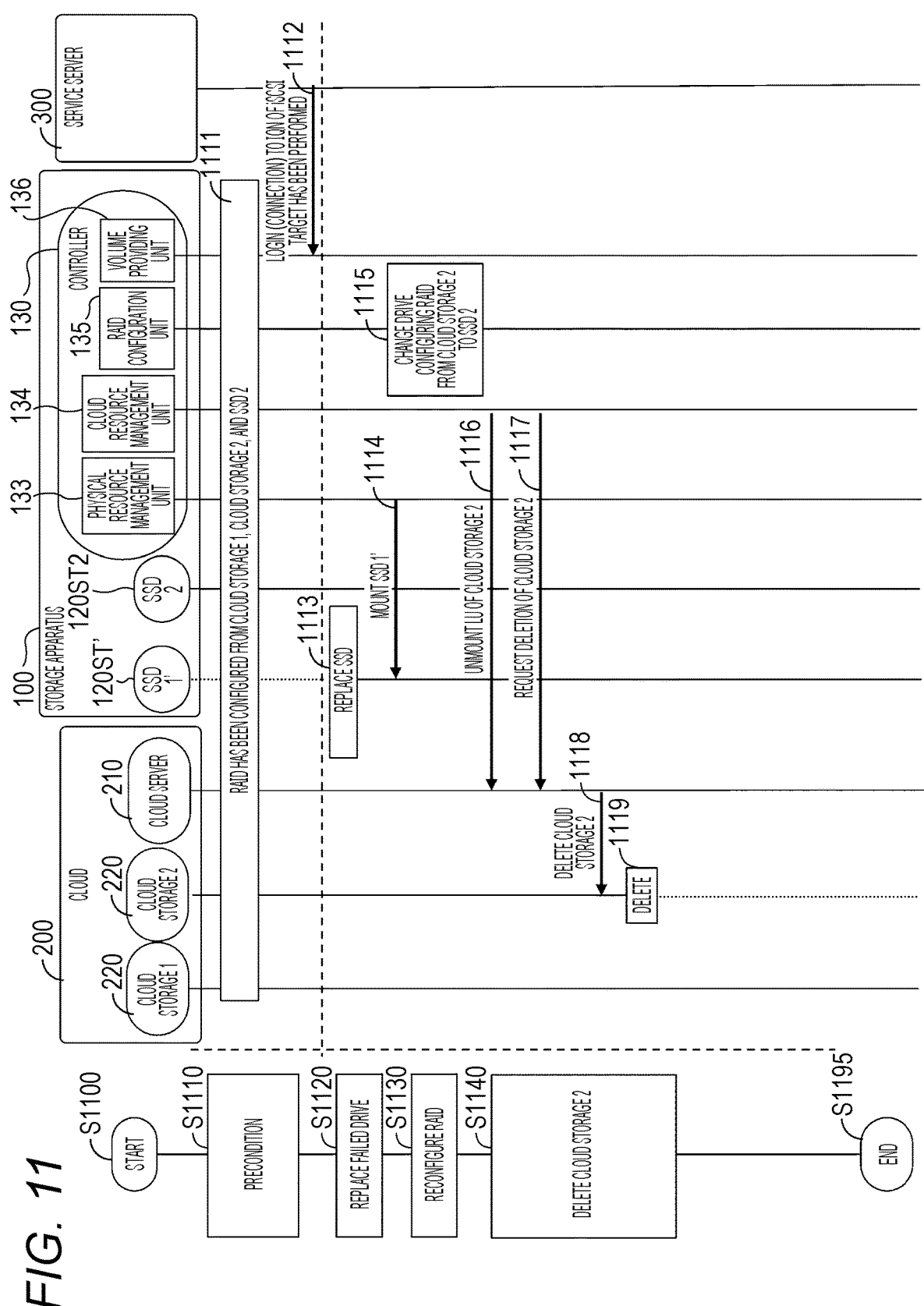
FIG. 11 is a flowchart and a sequence diagram for explaining an operation of the storage system.

FIG. 11 is a flowchart and a sequence diagram for explaining the operation of the storage system. The flowchart of FIG. 11 illustrates an outline of the operation of the storage system for removing the cloud storage 2 as an alternative after replacement of an SSD.

As illustrated in the flowchart of FIG. 11, the storage system starts the operation in S1100, sequentially performs the operations in S1110 to S1140 described below, then proceeds to S1195, and ends the operation flow.

S1110: The storage system is in a state where an operation satisfying a pre-condition has been completed.

S1120: In the storage system, replacement of the failed drive (SSD 1) is completed, and a new physical drive 120ST' (occasionally referred to as "SSD 1'") is installed.

S1130: The storage system reconfigures the RAID.

S1140: The storage system deletes the cloud storage 2 that is no longer needed.

The sequence diagram of FIG. 11 illustrates details of the operation of the storage system for removing the cloud storage 2 as an alternative after the replacement of the SSD. Steps 1111 and 1112 correspond to the operation in S1110 in the flowchart. Steps 1113 to 1119 correspond to the operations in S1120 to S1140 in the flowchart.

Step 1111: The cloud 200 and the storage apparatus 100 are in a state where the RAID has been configured from the cloud storage 1, the cloud storage 2, and the SSD 2.

Step 1112: The service server 300 has logged in (connected) to the IQN of the iSCSI target.

Step 1113: The SSD 1 is replaced with the SSD 1'.

Step 1114: The physical resource management unit 133 mounts the SDD1' in the physical server 110. The physical resource management unit 133 updates the device management information 500.

Step 1115: The RAID configuration unit 135 changes the drive configuring the RAID from the cloud storage 2 to the SSD 2. The RAID configuration unit 135 updates the configuration information 600.

Step 1116: The cloud resource management unit 134 requests the cloud server 210 to unmount the LU of the cloud storage 2. The cloud server 210 that has received the request unmounts the LU of the cloud storage 2. In step 1116, the cloud resource management unit 134 updates the device management information 500, and the cloud server 210 updates the device management information 310.

Step 1117: The cloud resource management unit 134 requests the cloud server 210 to delete the cloud storage 2.

Step 1118: The cloud server 210 deletes the cloud storage 2.

Step 1119: The cloud storage 2 is created. The cloud server 210 updates the device management information 310 and the correspondence information 400.

(Operation During Normal Operation)

(Writing Operation During Normal Operation)

Figure 12:
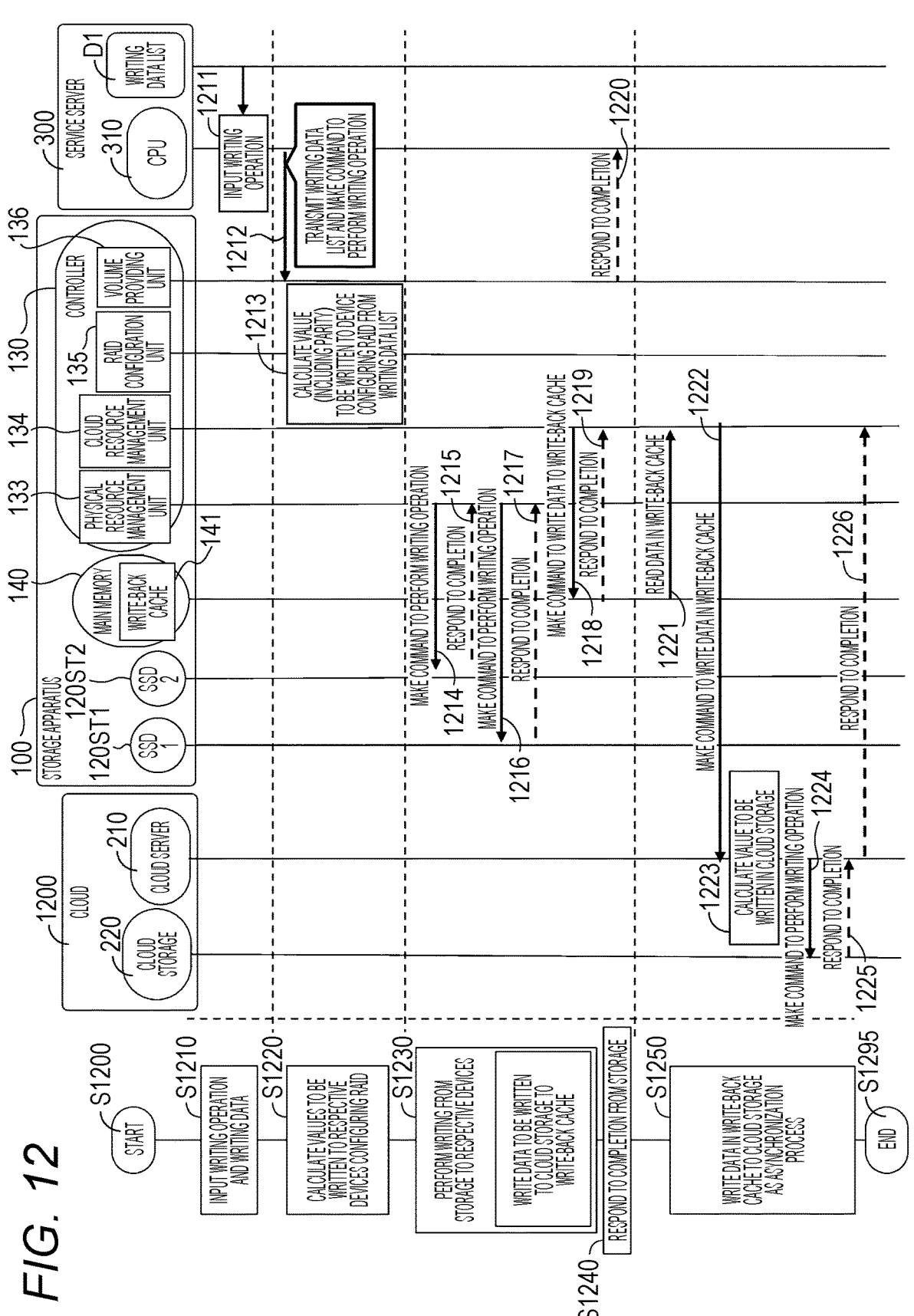
FIG. 12 is a flowchart and a sequence diagram for explaining an operation of the storage system.

FIG. 12 is a flowchart and a sequence diagram for explaining a writing operation during a normal operation of the storage system.

The flowchart of FIG. 12 illustrates an outline of the operation of the storage system for performing the writing operation.

As illustrated in the flowchart of FIG. 12, the storage system starts the operation in S1200, sequentially performs the operations in S1210 to S1250 described below, then proceeds to S1295, and ends the operation flow.

S1210: The CPU 310 of the service server 300 inputs the writing operation and writing data. That is, the CPU 310 of the service server 300 requests the storage apparatus 100 to write data.

S1220: The storage system calculates a value to be written to each device configuring the RAID.

S1230: The storage system performs writing from the storage apparatus 100 to each device. At this time, in the storage system, data to be written to the cloud storage 220 is written to the write-back cache area 141.

S1240: The storage system notifies the service server 300 about the completion of writing from the storage apparatus 100.

S1250: The storage system writes data in the write-back cache area 141 to the cloud storage 220 as an asynchronous process.

The sequence diagram of FIG. 12 illustrates details of the writing operation during the normal operation. Step 1211 corresponds to the operation in S1210 in the flowchart. Steps 1212 and 1213 correspond to the operation in S1220 in the flowchart. Steps 1214 to 1220 correspond to the operations in S1230 to S1240 in the flowchart. Steps 1221 to 1226 correspond to the operation in S1250 in the flowchart.

Step 1211: The CPU 310 of the service server 300 inputs a data writing operation. That is, the CPU 310 requests the storage apparatus 100 to write data.

Step 1212: The CPU 310 of the service server 300 transmits a writing data list D1, which is a list of data to be written to the RAIDed drive of the storage apparatus 100, and the command to perform the writing operation to the volume providing unit 136.

Step 1213: The RAID configuration unit 135 calculates a value (including parity) to be written to the device configuring the RAID from the writing data list D1.

Step 1214: The physical resource management unit 133 transmits a command to perform the data writing operation to the SSD 2 based on the calculation result.

Step 1215: The SSD 2 notifies the physical resource management unit 133 that the writing operation has been completed.

Step 1216: The physical resource management unit 133 transmits a command to perform a data writing operation to the SSD 1 based on the calculation result.

Step 1217: The SSD 1 notifies the physical resource management unit 133 that the writing operation has been completed.

Step 1218: The cloud resource management unit 134 transmits, to the main memory 140, a command to perform the operation for writing data to the write-back cache area 141 based on the calculation result. Note that this data corresponds to data written to the cloud storage 220 configuring the RAID.

Step 1219: The main memory 140 notifies the cloud resource management unit 134 that the writing operation has been completed.

Step 1220: The volume providing unit 136 notifies the CPU 310 of the service server 300 about the completion of the writing operation commanded by the CPU 310 of the service server 300 in step 1212.

Step 1221: The cloud resource management unit 134 reads data in the write-back cache area 141 from the main memory 140 in order to write the data in the cloud storage 220 as an asynchronous process.

Step 1222: The cloud resource management unit 134 transmits, to the cloud server 210, a command for writing data of the write-back cache.

Step 1223: The cloud server 210 calculates a value to be written to the cloud storage 220 (a value of a block address for writing data).

Step 1224: The cloud server 210 transmits a command to perform the writing operation to the cloud storage 220 based on the calculation result.

Step 1225: The cloud storage 220 notifies the cloud server 210 that the writing operation has been completed.

Step 1226: The cloud server 210 notifies the cloud resource management unit 134 of the storage apparatus 100 about the completion of the writing operation.

(Reading Operation During Normal Operation)

Figure 13:
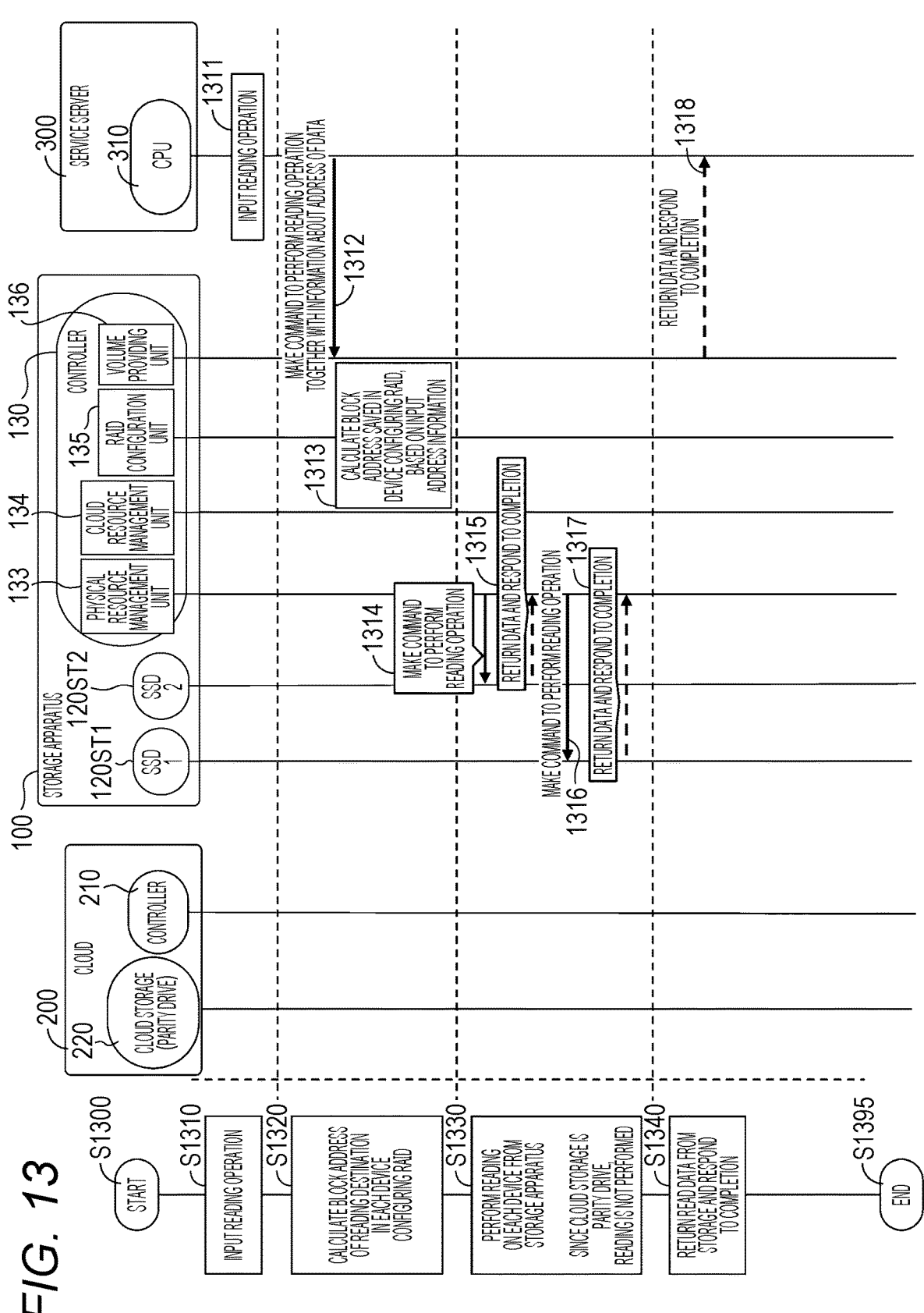
FIG. 13 is a flowchart and a sequence diagram for explaining an operation of the storage system.

FIG. 13 is a flowchart and a sequence diagram for explaining a reading operation during a normal operation of the storage system.

The flowchart of FIG. 13 illustrates an outline of the operation of the storage system for performing the reading operation.

As illustrated in the flowchart of FIG. 13, the storage system starts the operation in S1300, sequentially performs the operations in S1310 to S1340 described below, then proceeds to S1395, and ends the operation flow.

S1310: The CPU 310 of the service server 300 inputs the reading operation to the storage apparatus 100. That is, the CPU 310 of the service server 300 requests the storage apparatus 100 to read data.

S1320: The storage system calculates a reading destination block address in each device configuring the RAID.

S1330: The storage system performs reading from the storage apparatus 100 to each device. Note that the cloud storage 220 is a parity drive and thus does not perform reading. In the first embodiment, since the cloud storage 220 is the parity drive, it is possible to reduce the possibility that a data reading response is delayed.

S1340: The storage system returns the read data from the storage apparatus 100 to the service server 300, and notifies the service server about the completion of the reading operation.

The sequence diagram of FIG. 13 illustrates details of the reading operation during the normal operation. Step 1311 corresponds to the operation in S1310 in the flowchart. Steps 1312 and 1313 correspond to the operation in S1320 in the flowchart. Steps 1314 to 1317 correspond to the operation in S1330 in the flowchart. Step 1318 corresponds to the operation in S1340 in the flowchart.

Step 1311: The CPU 310 of the service server 300 inputs a data reading operation.

Step 1312: The CPU 310 of the service server 300 commands the volume providing unit 136 to transmit address information containing data and perform the reading operation.

Step 1313: The RAID configuration unit 135 calculates a block address saved in the device configuring the RAID, based on the input address information.

Step 1314: The physical resource management unit 133 commands the SSD 2 to perform the reading operation, based on the calculation result of the block address.

Step 1315: The SSD 2 returns data to the physical resource management unit 133, and notifies this unit about the completion of the reading operation.

Step 1316: The physical resource management unit 133 commands the SSD 1 to perform the reading operation based on the calculation result of the block address.

Step 1317: The SSD 1 returns data to the physical resource management unit 133, and notifies this unit about the completion of the reading operation.

Step 1318: The volume providing unit 136 returns the data to the service server 300 and notifies this server about the completion of the reading operation.

(Operation During Alternative Operation)

(Writing Operation During Alternative Operation)

Figure 14:
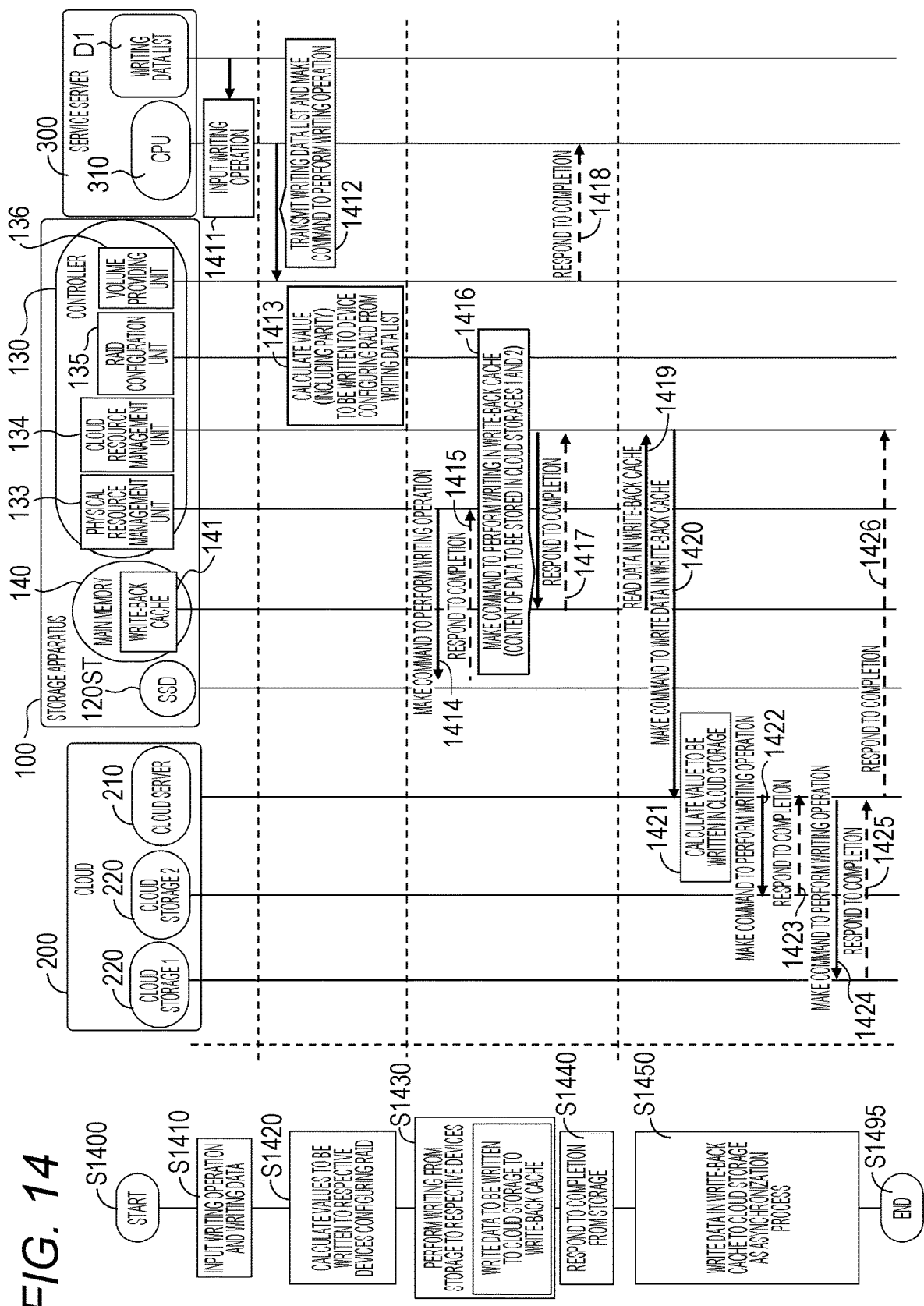
FIG. 14 is a flowchart and a sequence diagram for explaining an operation of the storage system.

FIG. 14 is a flowchart and a sequence diagram for explaining a writing operation during an alternative operation of the storage system.

The flowchart of FIG. 14 illustrates an outline of the operation of the storage system for performing the writing operation.

As illustrated in the flowchart of FIG. 14, the storage system starts the operation in S1400, sequentially performs the operations in S1410 to S1450 described below, then proceeds to S1495, and ends the operation flow.

S1410: The CPU 310 of the service server 300 inputs the writing operation and writing data.

S1420: The storage system calculates a value to be written to each device configuring the RAID.

S1430: The storage system performs writing from the storage apparatus 100 to each device. At this time, in the storage system, data to be written to the cloud storage 1 and the cloud storage 2 are written to the write-back cache area 141.

S1440: The storage system notifies the service server 300 about the completion of writing from the storage apparatus 100.

S1450: The storage system writes data in the write-back cache area 141 to the cloud storage 220 as an asynchronous process.

The sequence diagram of FIG. 14 illustrates details of the writing operation during the normal operation. Step 1411 corresponds to the operation in S1410 in the flowchart. Steps 1412 and 1413 correspond to the operation in S1420 in the flowchart. Steps 1414 through 1418 correspond to the operations in S1430 and S1440. Steps 1419 to 1426 correspond to the operation in S1450 in the flowchart.

Step 1411: The CPU 310 of the service server 300 inputs a data writing operation. That is, the CPU 310 of the service server 300 requests the storage apparatus 100 to write data.

Step 1412: The CPU 310 of the service server 300 transmits the writing data list D1 and a command to perform the writing operation to the volume providing unit 136.

Step 1413: The RAID configuration unit 135 calculates a value (including parity) to be written to the device configuring the RAID from the writing data list D1.

Step 1414: The physical resource management unit 133 transmits a command to perform the data writing operation to the SSD (the physical resource 120ST) based on the calculation result.

Step 1415: The SSD notifies the physical resource management unit 133 that the writing operation has been completed.

Step 1416: The cloud resource management unit 134 transmits, to the main memory 140, a command to perform the operation for writing data to the write-back cache area 141 based on the calculation result. Note that this data corresponds to data written to the cloud storage 1 and the cloud storage 2 configuring the RAID.

Step 1417: The main memory 140 notifies the cloud resource management unit 134 that the writing operation has been completed.

Step 1418: The volume providing unit 136 notifies the CPU 310 of the service server 300 about the completion of the writing operation commanded by the CPU 310 of the service server 300 in step 1212.

Step 1419: The cloud resource management unit 134 reads data in the write-back cache area 141 from the main memory 140 in order to write the data in the cloud storage 1 and the cloud storage 2 as an asynchronous process.

Step 1420: The cloud resource management unit 134 transmits, to the cloud server 210, a command for writing data of the write-back cache.

Step 1421: The cloud server 210 calculates values to be written to the cloud storage 1 and the cloud storage 2 (values of block addresses for writing data).

Step 1422: The cloud server 210 transmits a command to perform the writing operation to the cloud storage 2 based on the calculation result.

Step 1423: The cloud storage 2 notifies the cloud server 210 that the writing operation has been completed.

Step 1424: The cloud server 210 transmits a command to perform the writing operation to the cloud storage 1 based on the calculation result.

Step 1425: The cloud storage 1 notifies the cloud server 210 that the writing operation has been completed.

Step 1426: The cloud server 210 notifies the cloud resource management unit 134 of the storage apparatus 100 about the completion of the writing operation.

(Reading Operation During Alternative Operation)

Figure 15:
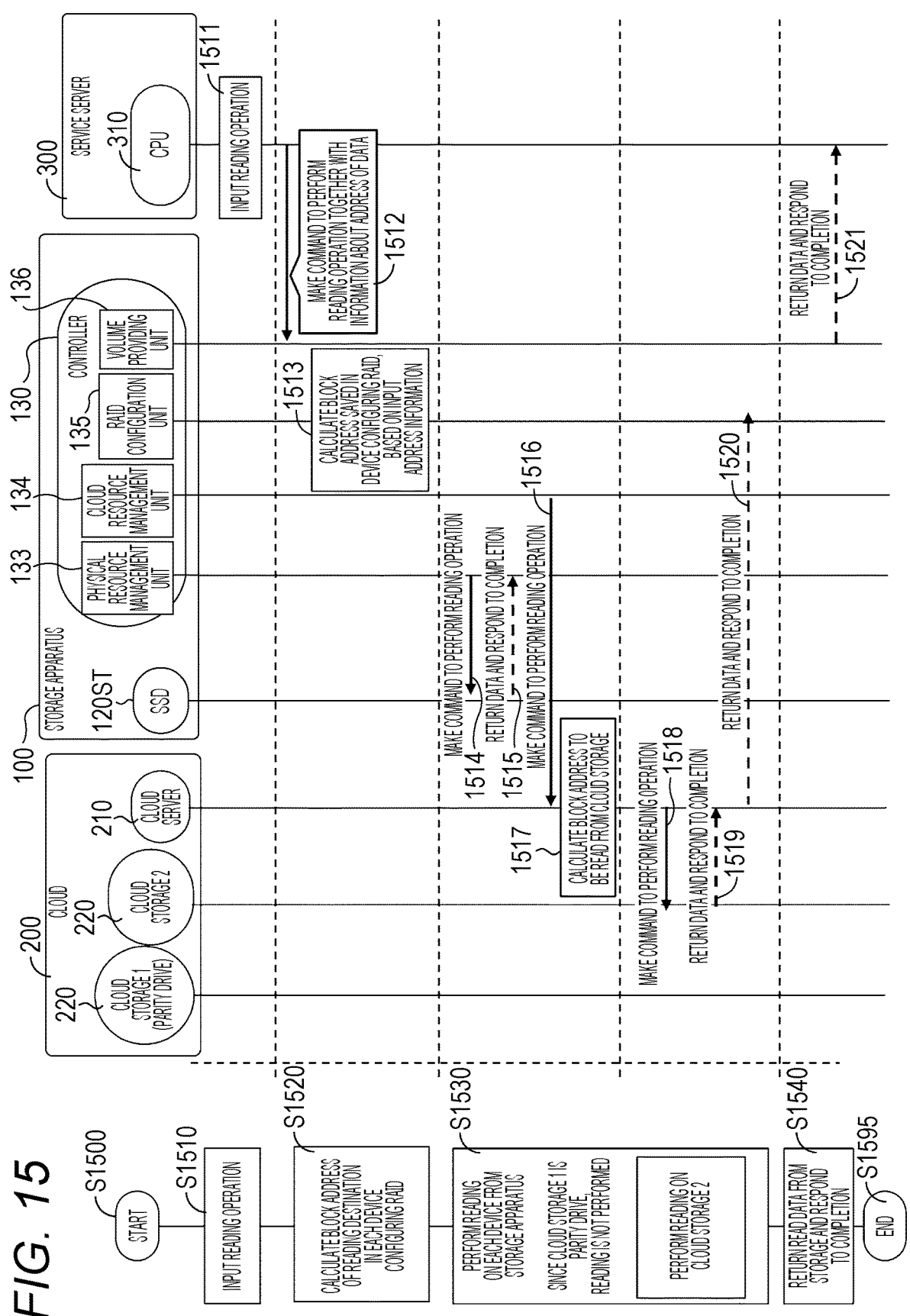
FIG. 15 is a flowchart and a sequence diagram for explaining an operation of the storage system.

FIG. 15 is a flowchart and a sequence diagram for explaining a reading operation during an alternative operation of the storage system.

The flowchart of FIG. 15 illustrates an outline of the operation of the storage system for performing the reading operation.

As illustrated in the flowchart of FIG. 15, the storage system starts the operation in S1500, sequentially performs the operations in S1510 to S1540 described below, then proceeds to S1595, and ends the operation flow.

S1510: The CPU 310 of the service server 300 inputs the reading operation.

S1520: The storage system calculates a reading destination block address in each device configuring the RAID.

S1530: The storage system performs reading from the storage apparatus 100 to each device. Note that the cloud storage 1 is a parity drive and thus does not perform reading. The storage system perform reading on the cloud storage 2.

S1540: The storage system returns the read data from the storage apparatus 100 to the service server 300, and notifies this server about the completion of the reading operation.

The sequence diagram of FIG. 15 illustrates details of the reading operation during the alternative operation. Step 1511 corresponds to the operation in S1510 in the flowchart. Steps 1512 and 1513 correspond to the operation in S1520 in the flowchart. Steps 1514 to 1520 correspond to the operation in S1530 in the flowchart. Step 1521 corresponds to the operation in S1540 in the flowchart.

Step 1511: The CPU 310 of the service server 300 inputs a data reading operation.

Step 1512: The CPU 310 of the service server 300 commands the volume providing unit 136 to transmit address information containing data and perform the reading operation.

Step 1513: The RAID configuration unit 135 calculates a block address saved in the device configuring the RAID, based on the input address information.

Step 1514: The physical resource management unit 133 commands the SSD to perform the reading operation, based on the calculation result of the block address.

Step 1515: The SSD returns data to the physical resource management unit 133, and notifies this unit about the completion of the reading operation.

Step 1516: The cloud resource management unit 134 commands the cloud server 210 to perform the reading operation, based on the calculation result of the block address.

Step 1517: The cloud server 210 calculates a block address to be read from the cloud storage 2.

Step 1518: The cloud server 210 commands the cloud storage 2 to perform the reading operation, based on the calculation result of the block address.

Step 1519: The cloud storage 2 returns data to the cloud server 210, and notifies the cloud server about the completion of the reading operation.

Step 1520: The cloud server 210 returns data to the RAID configuration unit 135 and notifies this unit about the completion of the read operation.

Step 1521: The volume providing unit 136 returns the data to the service server 300 and notifies this unit about the completion of the completion of the reading operation.

Effects

As described above, in the storage system according to the first embodiment of the present invention, in a case where a failure occurs in the physical drive 120ST of the storage apparatus 100 in the on-premises environment OP1, the failed physical drive 120ST can be quickly replaced with the cloud storage 220 to configure the RAID. This can shorten the period during which the redundancy is deteriorated.

Further, since the storage system according to the first embodiment deletes the cloud storage 220 that becomes unnecessary after the additional installation of the physical drive 120ST is completed after the replacement, the cost required for using the cloud storage 220 can be reduced as compared with a case where the cloud storage 220 is not deleted.

In the storage system according to the first embodiment, only the parity data is stored in the cloud storage 220, but the data cannot be restored from only the parity data, thus reducing a security problem.

Furthermore, the storage system according to the first embodiment is not usually used as a data drive by placing only a parity as the data in the cloud environment CL1. This can reduce the possibility that a reading response is delayed.

In the storage system according to the first embodiment, as for a countermeasure against the low writing speed, when data to be written to the cloud storage 220 is written as a write-back cache onto the main memory 140, the writing is considered to be completed. The storage system according to the first embodiment actually performs writing (uploading) to cloud storage 220 asynchronously later, and this can reduce the influence of a delay due to communication.

Second Embodiment

Figure 16:
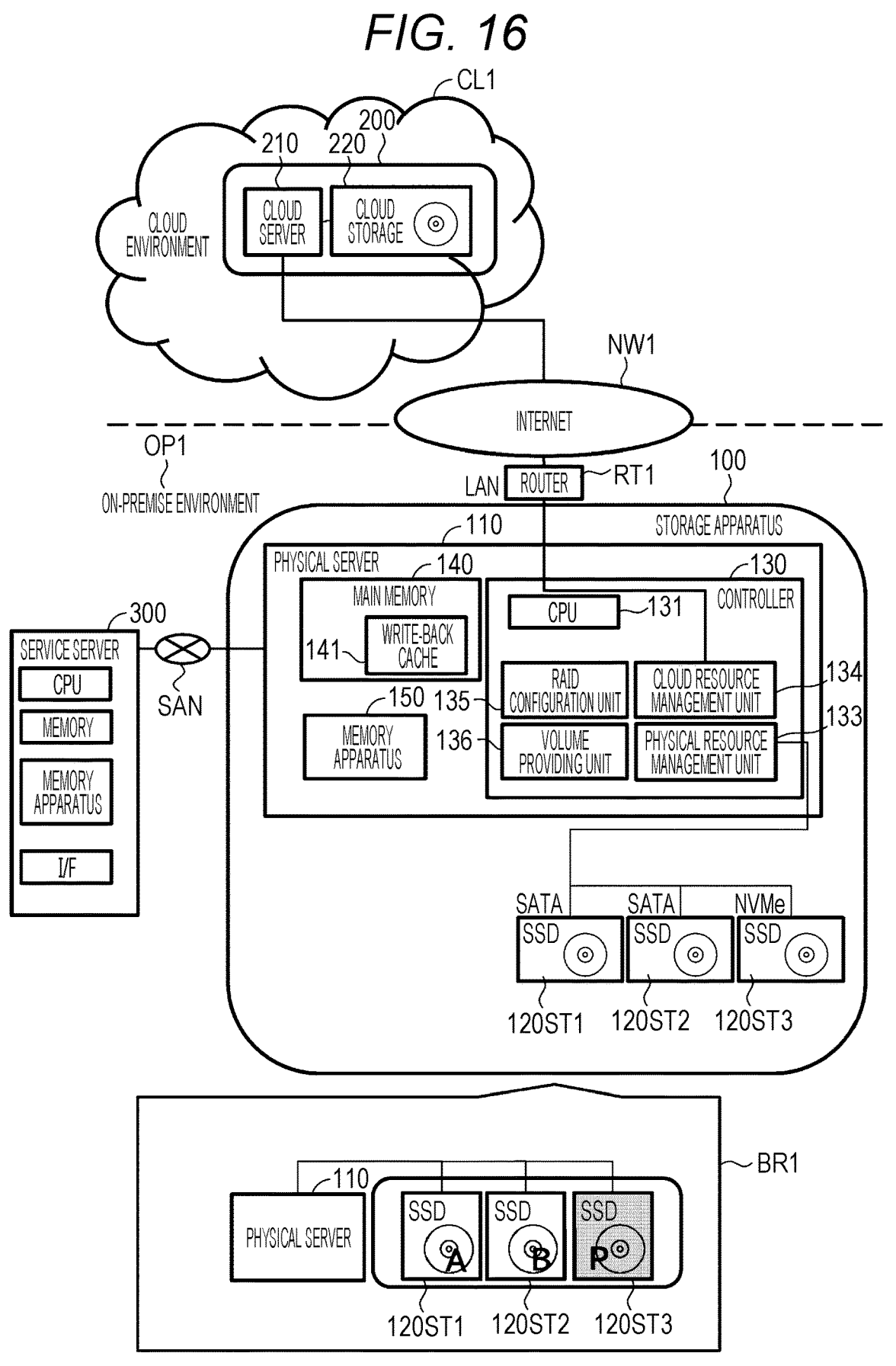

A storage system according to a second embodiment of the present invention will be described. FIG. 16 illustrates a configuration example of a system including the storage system according to the second embodiment of the present invention.

In the first embodiment, during the normal operation, in the storage apparatus 100, the RAID is configured by the physical drive 120ST1, the physical drive 120ST2, and the cloud storage 220.

On the other hand, in the storage system according to the second embodiment, as illustrated in a block BR1 of FIG. 16, during the normal operation, the physical drive 120ST1, the physical drive 120ST2, and the physical drive 120ST3 configure the RAID in the storage apparatus 100. In the storage system according to the second embodiment, in a case where a failure occurs in the physical drive 120ST, the cloud storage 220 is used as a parity disk (parity drive) for parity, and the cloud storage 220 is substituted for the physical drive 120ST where the failure has occurred.

Hereinafter, this difference will be mainly described.

<Use Case 1>

Figure 17:
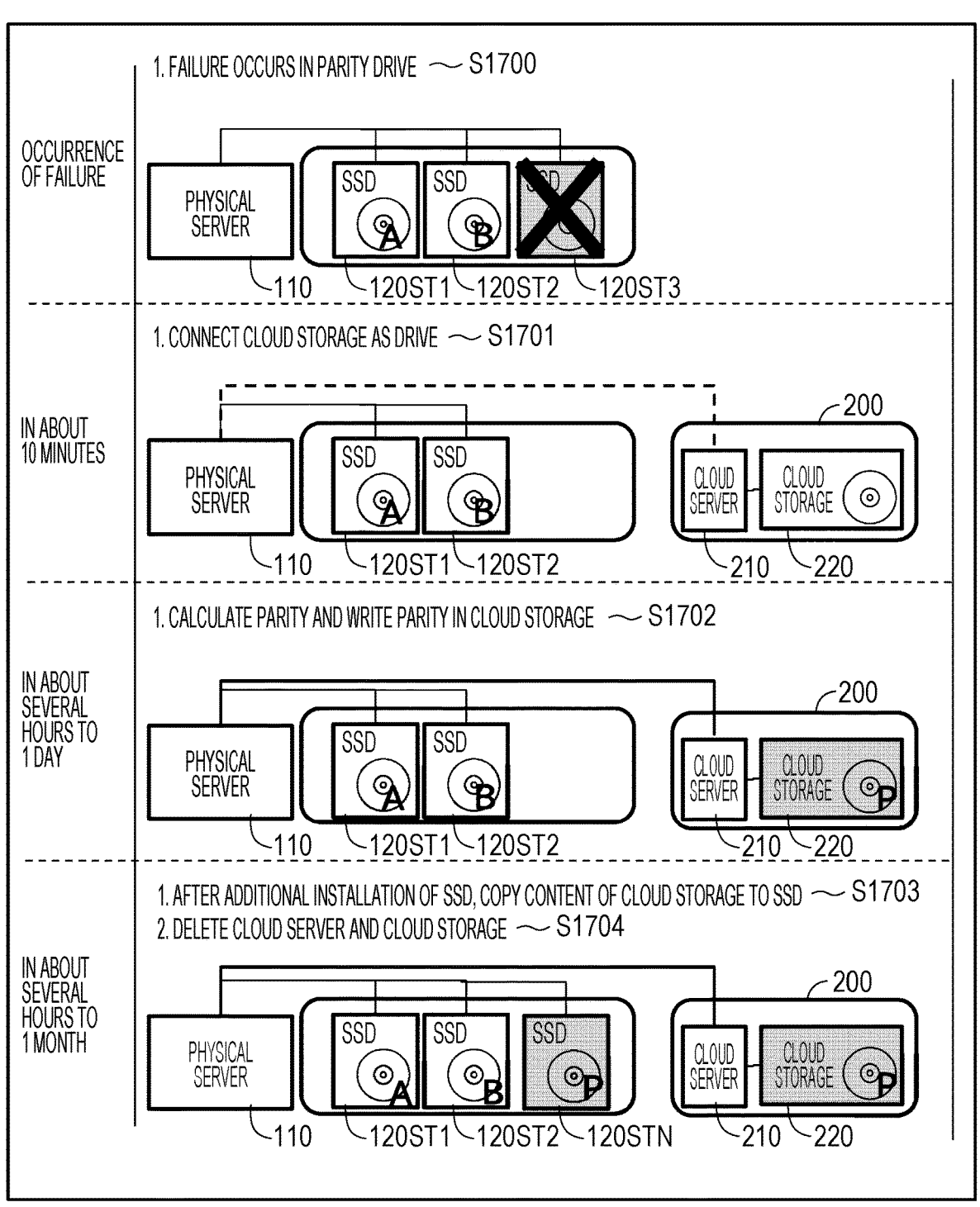
FIG. 17 explains an example of a use case 1 of the storage system according to the second embodiment of the present invention.

An example of a use case 1 of the storage system according to the second embodiment will be described. FIG. 17 explains the example of the use case 1 of the storage system according to the second embodiment.

A failure occurs in a physical drive 120ST3 (a parity drive) (S1700). The storage system connects the additional cloud storage 220 as a drive (S1701). The storage system calculates a parity and writes the parity in the added cloud storage 220 (S1702). After additionally installing the physical drive 120STN (SSD), the storage system copies contents of the added cloud storage 220 to the added physical drive 120STN (SSD) (S1703). Thereafter, the storage system deletes the added cloud storage 220 (S1704).

<Use Case 2>

Figure 18:
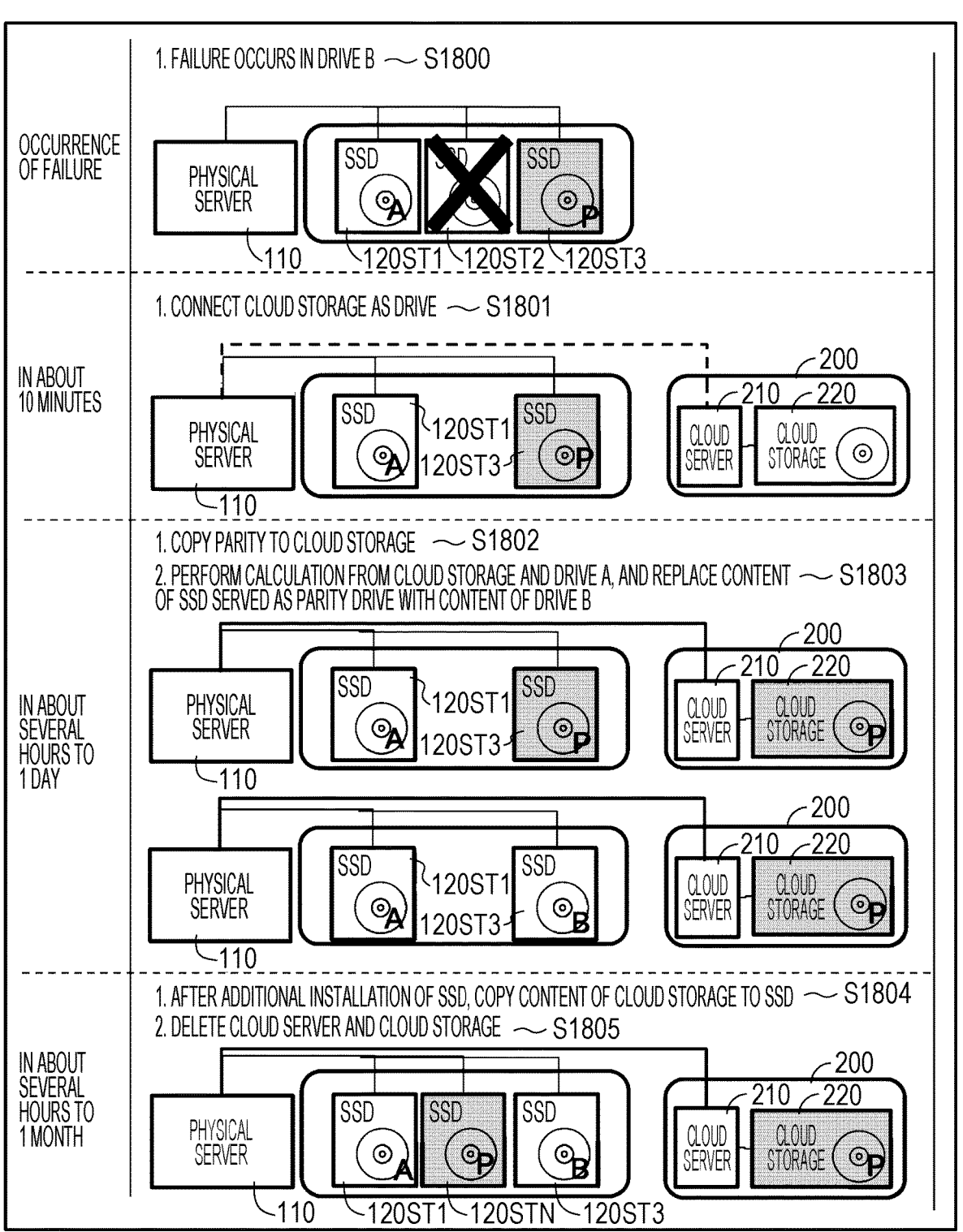
FIG. 18 explains an example of a use case 2 of the storage system according to the second embodiment of the present invention.

An example of a use case of the storage system according to the second embodiment will be described. FIG. 18 explains the example of the use case of the storage system according to the second embodiment.

A failure occurs in a physical drive 120ST2 (a drive B) (S1800). The storage system connects the additional cloud storage 220 as a drive (S1801). The storage system copies a parity to the cloud storage 220 (S1802). The storage system performs calculation from the cloud storage 220 and the physical drive 120ST1 (a drive A), and rewrites the contents of the physical drive 120ST3 (SSD) that has been the parity drive into a contents of the physical drive 120ST2 (the drive B) (S1803).

After additionally installing the physical drive 120STN (SSD), the storage system copies contents of the cloud storage 220 to the additionally installed physical drive 120STN (SSD) (S1804). Thereafter, the storage system deletes the added cloud storage 220 (S1805).

<Specific Operation>

Figure 19:
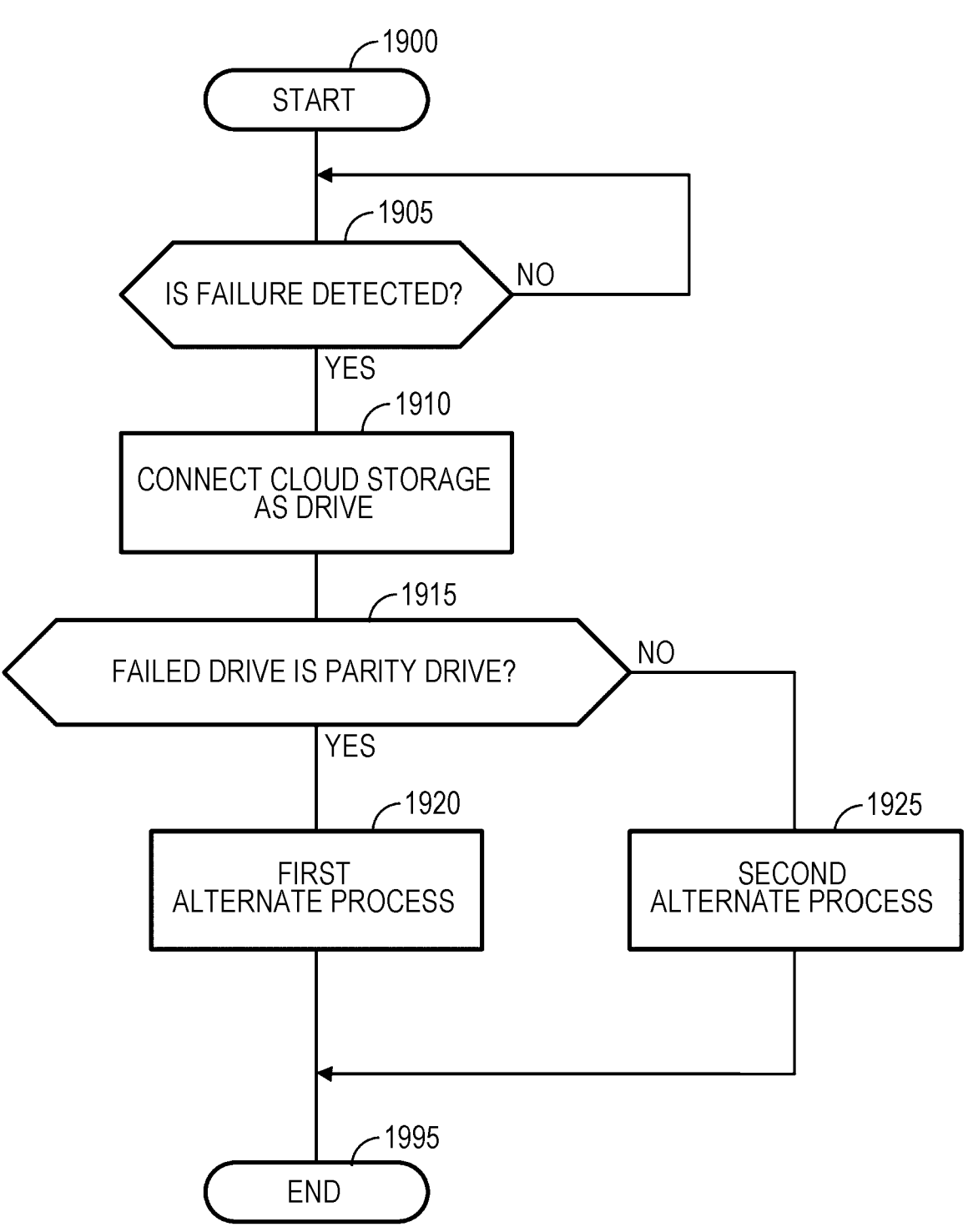
FIG. 19 is a flowchart illustrating a process executed by a controller of the storage system during normal operation.

FIG. 19 is a flowchart illustrating a process flow executed by the controller 130 of the storage system during the normal operation. The controller 130 starts the process in step 1900 and proceeds to step 1905 to determine whether a failure of a physical drive is detected.

In a case where no failure of a physical drive is detected, the controller 130 determines as "NO" in step 1905 and performs the process in step 1905 again.

In a case where a failure of a physical drive is detected, the controller 130 determines as "YES" in step 1905, proceeds to step 1910, connects the cloud storage 220 as a drive, and then proceeds to step 1915.

In step 1915, the controller 130 determines whether the failed drive is a parity drive.

Figure 20:
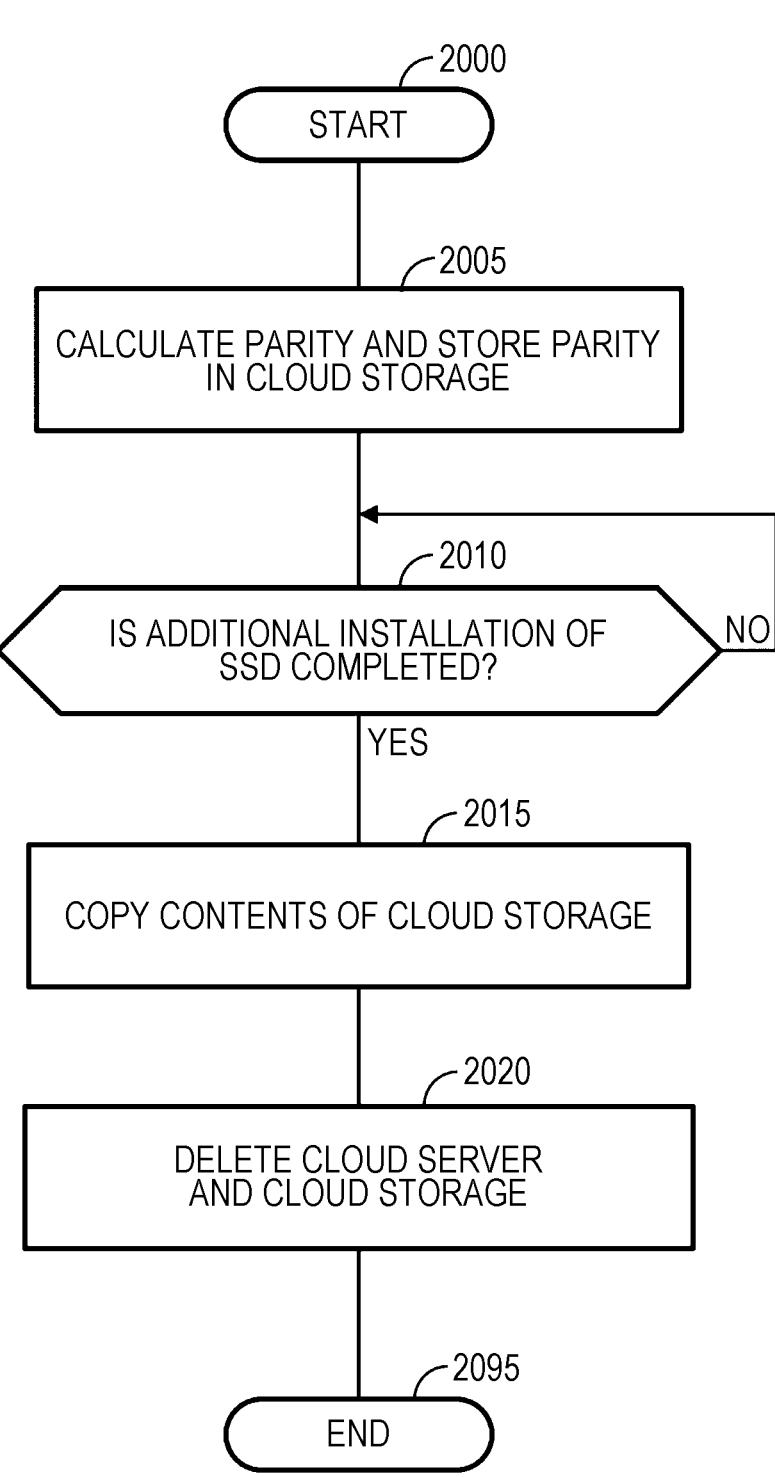
FIG. 20 is a flowchart illustrating a process executed by the controller of the storage system.

In a case where the failed drive is a parity drive, the controller 130 determines as "YES" in step 1915, proceeds to step 1920, executes a first alternative process illustrated by the flowchart in FIG. 20, proceeds to step 1995, and ends the process flow.

In a case where the failed drive is not a parity drive, the controller 130 determines as "NO" in step 1915, proceeds to step 1925, executes a second alternative process illustrated by the flowchart in FIG. 21, proceeds to step 1995, and ends the process flow.

FIG. 20 is a flowchart illustrating a process flow of the first alternative process executed by the controller 130 of the storage system when a failure occurs. When proceeding to step 1920 in FIG. 19, the controller 130 starts the process in step 2000 in FIG. 20, and proceeds to step 2005 to calculate a parity and store the parity in the cloud storage 220.

Thereafter, the controller 130 proceeds to step 2010 and determines whether the additional installation of the SSD is completed. In a case where the additional installation of the SSD is not completed, the controller 130 determines as "NO" in step 2010 and executes the process in step 2010 again.

In a case where the additional installation of the SSD is completed, the controller 130 determines as "YES" in step 2010, sequentially executes the processes in step 2015 and step 2020 described below, and then proceeds to step 2095 to end the process flow.

Step 2015: The controller 130 copies the contents of the cloud storage 220 to the additionally installed SSD.

Step 2020: The controller 130 deletes the cloud server 210 and the cloud storage 220.

FIG. 21 is a flowchart illustrating a process flow of the second alternative process executed by the controller 130 of the storage system when a failure occurs. When proceeding to step 1925 in FIG. 19, the controller 130 starts the process in step 2100 in FIG. 21, and proceeds to step 2105 to copy a parity to the cloud storage 220. Thereafter, the controller 130 proceeds to step 2110, performs calculation from the cloud storage 220 and the other drives constituting the RAID where the failure does not occur, and rewrites the contents of the drive which is the parity drive into the contents of the drive where the failure occurs.

Thereafter, the controller 130 proceeds to step 2115 and determines whether the additional installation of the SSD is completed. In a case where the additional installation of the SSD has not been completed, the controller 130 determines as "NO" in step 2115 and executes the process in step 2115 again.

In a case where the additional installation of the SSD has been completed, the controller 130 determines as "YES" in step 2115, sequentially executes the processes in step 2120 and step 2125 described below, and then proceeds to step 2195 to end the process flow.

Step 2120: The controller 130 copies the contents of the cloud storage 220 to the additionally installed SSD.

Step 2125: The controller 130 deletes the cloud server 210 and the cloud storage 220.

Effects

As described above, when a physical drive fails in the storage apparatus 100, the storage system according to the second embodiment of the present invention can perform quick recovery by using the cloud storage 220 provided from the cloud 200 as a substitute for the failed physical drive.

In a case where a failure occurs in a physical drive, the storage system according to the second embodiment of the present invention uses the cloud 200 only during a period until the additional installation of a physical drive is completed. That is, the storage system according to the second embodiment does not use the cloud 200 during the normal operation but temporarily uses it (until the drive is replaced (until the device is additionally installed)). This can reduce the cost required for using the cloud 200 as compared with the case of using the cloud 200 also during the normal operation.

Further, the storage system according to the second embodiment does not use the cloud storage 220 as a data drive by placing only a parity as the data in the cloud storage 220 during the alternative operation. This can reduce the possibility that the reading response is delayed.

In the storage system according to the second embodiment, during the alternative operation, as for a countermeasure against the low writing speed, when data to be written to the cloud storage 220 is written as a write-back cache onto the main memory 140, the writing is considered to be completed. The storage system according to the second embodiment actually performs writing (uploading) to cloud storage 220 asynchronously later, and this can reduce the influence of a delay due to communication.

Modified Example

The present invention is not limited to the above embodiments, and various modifications can be adopted within the scope of the present invention. Furthermore, the above-described embodiments can be combined with each other as long as they do not depart from the scope of the present invention.

The present invention can also have the following configuration.

[1] A management method for a storage system including a storage apparatus having a plurality of memory apparatuses and a controller, the plurality of memory apparatuses or the plurality of memory apparatuses and a memory area provided by a cloud configuring redundant array of inexpensive disks (RAID), the plurality of RAIDed memory apparatuses or the plurality of memory apparatuses and the memory area providing a volume to a computer, the method comprising:

causing the controller to additionally install the memory area in a case where a physical failure occurs in the memory apparatus among the plurality of memory apparatuses, and to maintain a RAID configuration before occurrence of the physical failure in the memory apparatus using the plurality of memory apparatuses excluding the memory apparatus where the physical failure has occurred and the memory area additionally installed.

What is claimed is:

1. A storage system for restoring full redundancy in a redundant array of independent disks (RAID) while avoiding permanent allocation of on-premises spare disks, the storage system comprising:

a plurality of on-premises memory apparatuses interconnected by a local storage fabric;

a hardware RAID controller including at least one processor, a non-transitory memory that stores firmware instructions, and a wide-area-network (WAN) interface; and a cloud-access module authenticated to provision, over the WAN, an ephemeral block-level memory area hosted in a public-cloud availability zone physically remote from the on-premises memory apparatuses;

wherein the firmware instructions, when executed by the processor, cause the hardware RAID controller to:

monitor the plurality of on-premises memory apparatuses for a physical-failure event;

detect that a particular memory apparatus among the on-premises memory apparatuses has experienced the physical-failure event;

provision, in response to the physical-failure event and only after the event, a remotely hosted memory area in the ephemeral block-level memory area with a capacity at least equal to a capacity of the particular memory apparatus that failed;

incorporate the remotely hosted memory area into the RAID together with the on-premises memory apparatuses other than the particular memory apparatus such that a RAID level that existed immediately before the physical-failure event is re-established;

service host read and write operations during re-establishment of the RAID by committing data destined for the remotely hosted memory area to a non-volatile write-back cache and flushing the data asynchronously over the WAN; and after the particular memory apparatus is replaced and the RAID is re-mirrored locally, copy data or parity stored in the remotely hosted memory area back into a replacement memory apparatus and detach the remotely hosted memory area.

2. The storage system of claim 1, wherein, before the physical-failure event, the RAID is configured by the plurality of on-premises memory apparatuses together with the remotely hosted memory area, and only the remotely hosted memory area includes a parity-storage region that stores parity calculated from data written to the RAID.

3. The storage system of claim 2, wherein the firmware instructions further cause the hardware RAID controller, when the physical-failure event occurs in one of the on-premises memory apparatuses, to substitute the remotely hosted memory area for the particular memory apparatus and to reconstruct, in the remotely hosted memory area, data formerly stored in the particular memory apparatus based on data stored in the remaining on-premises memory apparatuses and in the remotely hosted memory area.

4. The storage system of claim 1, wherein, before the physical-failure event, the RAID is configured exclusively by the plurality of on-premises memory apparatuses, and the plurality of on-premises memory apparatuses includes a parity storage memory apparatus that stores parity calculated from data written to the RAID.

5. The storage system according to claim 4, wherein the firmware instructions further cause the hardware RAID controller, when the particular memory apparatus experiences the physical-failure event, to substitute the remotely hosted memory area for the particular memory apparatus and to reconstruct, in the remotely hosted memory area, the parity formerly stored in the particular parity stored in the memory apparatus based on data stored in the remaining on-premises memory apparatuses.

6. The storage system of claim 1, wherein, after the physical-failure event has been remedied by installing a replacement on-premises memory apparatus, the firmware instructions cause the hardware RAID controller to detach and delete the remotely hosted memory area.

7. The storage system of claim 1, wherein, while the RAID includes the remotely hosted memory area, the firmware instructions cause the hardware RAID controller to calculate data to be written to the provisioned remotely hosted memory area using a write-back cache method based on data slated for storage in the on-premises memory apparatuses and in the remotely hosted memory area.

8. A computer-implemented method for restoring full redundancy in a redundant array of independent disks (RAID) of a storage system while avoiding permanent allocation of on-premises spare disks, the method comprising:

monitoring a plurality of on-premises memory apparatuses for a physical-failure event;

detecting that a particular one of the plurality of memory apparatuses has experienced the physical-failure event;

provisioning, in response to and only after the physical-failure event, an ephemeral block-level memory area over a wide-area network (WAN), the memory area being hosted in a public-cloud availability zone physically remote from the on-premises memory apparatuses and having a capacity at least equal to that of the particular memory apparatus;

incorporating the provisioned block-level memory area into the RAID together with the on-premises memory apparatuses other than the particular memory apparatus, thereby re-establishing the RAID level that existed immediately before the physical-failure event;

servicing host read and write operations during re-establishment of the RAID by committing data destined for the provisioned block-level memory area to a non-volatile write-back cache and flushing the data asynchronously over the WAN;

after the particular memory apparatus is replaced and the RAID is re-mirrored locally, copying data or parity stored in the provisioned block-level memory area back into the replacement memory apparatus; and detaching the provisioned block-level memory area after the copying is complete.

9. The storage system of claim 4, wherein, when the physical-failure event occurs in a data-storage memory apparatus other than the parity-storage memory apparatus, the firmware instructions further cause the hardware RAID controller to (i) substitute the remotely hosted memory area additionally installed, and for the particular memory apparatus, (ii) copy the parity stored in the parity-storage memory apparatus into the remotely hosted memory area, and (iii) regenerate, in the parity-storage memory apparatus, data formerly stored in the particular memory apparatus based on data stored in the remaining on-premises memory apparatuses and in the remotely hosted memory area.

* * * * *